US010442105B2

(12) United States Patent
Tozuka et al.

(10) Patent No.: US 10,442,105 B2
(45) Date of Patent: Oct. 15, 2019

(54) CUTTING LINE POSITIONING APPARATUS AND METHOD THAT REDUCE BREAKAGE DURING SHEET CUTTING

(71) Applicant: Roland DG Corporation, Hamamatsu-shi, Shizuoka (JP)

(72) Inventors: Takeshi Tozuka, Hamamatsu (JP); Kazutoshi Funakoshi, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 50 days.

(21) Appl. No.: 15/848,209

(22) Filed: Dec. 20, 2017

(65) Prior Publication Data

US 2018/0169889 A1    Jun. 21, 2018

(30) Foreign Application Priority Data

Dec. 21, 2016 (JP) .................. 2016-247632

(51) Int. Cl.
*B26F 1/38* (2006.01)
*B26D 3/08* (2006.01)
(Continued)

(52) U.S. Cl.
CPC ............ *B26F 1/3806* (2013.01); *B26D 3/085* (2013.01); *B26D 5/005* (2013.01); *B26F 1/18* (2013.01); *G05B 19/414* (2013.01)

(58) Field of Classification Search
CPC . B26D 3/085; B26D 5/005; B26F 1/18; B26F 1/3806; G05B 19/414
See application file for complete search history.

(56) References Cited

U.S. PATENT DOCUMENTS

| 3,970,830 A * | 7/1976 | White ................. G05B 19/184 700/187 |
| 6,449,526 B1 * | 9/2002 | Sachs .................... B23Q 17/09 700/164 |

(Continued)

FOREIGN PATENT DOCUMENTS

JP          06-238594 A       8/1994

OTHER PUBLICATIONS

Tozuka et al., "Cutting Line Positioning Apparatus, Cutting System, Non-Transitory Computer-Readable Storage Medium Storing Cutting Line Positioning Computer Program, and Cutting Line Positioning Method", U.S. Appl. No. 15/848,214, filed Dec. 20, 2017.

*Primary Examiner* — Chun Cao
(74) *Attorney, Agent, or Firm* — Keating & Bennett, LLP

(57) ABSTRACT

A positioning apparatus includes a cutting line setting processor to set a cutting line to extend in a predetermined direction from a first endpoint on an outline of a target object located on a top sheet and to be located within a non-effective region, a first determination processor to determine whether a first angle between the outline of the target object and the cutting line, with the first endpoint located at an intersection of the outline and the cutting line, is equal to or smaller than a predetermined determination angle that is an acute angle, and a shape change processor to, when the first angle is determined to be equal to or smaller than the determination angle by the first determination processor, change the shape of the cutting line such that the first angle is greater than the determination angle.

16 Claims, 14 Drawing Sheets

(51) Int. Cl.
*B26F 1/18* (2006.01)
*B26D 5/00* (2006.01)
*G05B 19/414* (2006.01)

(56) References Cited

U.S. PATENT DOCUMENTS

| | | | | |
|---|---|---|---|---|
| 9,053,547 | B2* | 6/2015 | Kitamura | G01B 11/24 |
| 2010/0028067 | A1* | 2/2010 | Wanibuchi | B41J 11/0075 |
| | | | | 400/621 |
| 2018/0058843 | A1* | 3/2018 | Tabuchi | G01B 21/04 |

* cited by examiner

CUTTING LINE POSITIONING APPARATUS AND METHOD THAT REDUCE BREAKAGE DURING SHEET CUTTING

CROSS REFERENCE TO RELATED APPLICATIONS

This application claims the benefit of priority to Japanese Patent Application No. 2016-247632 filed on Dec. 21, 2016. The entire contents of this application are hereby incorporated herein by reference.

BACKGROUND OF THE INVENTION

1. Field of the Invention

The present invention relates to cutting line positioning apparatuses, cutting systems, non-transitory computer-readable storage media storing cutting line positioning computer programs, and cutting line positioning methods.

2. Description of the Related Art

A cutting apparatus for cutting a sheet is known in the related art. As used herein, the term "cutting" refers not only to cutting a sheet entirely in its thickness direction but also to cutting a sheet partially in its thickness direction. In one example, a cutting apparatus includes a carriage two-dimensionally movable relative to a sheet, and a cutter mounted on the carriage.

Examples of sheets to be cut by such a cutting apparatus include a sheet disclosed in JP 6-238594 A. The sheet disclosed in JP 6-238594 A includes a base sheet, and a top sheet affixed to a surface of the base sheet with an adhesive. The top sheet includes a region where a necessary target object, such as a character or a figure, is present (which will hereinafter be referred to as an "effective region"), and a region other than the effective region (which will hereinafter be referred to as a "non-effective region"). In one example, a portion of the top sheet within the effective region is left on the base sheet, and a portion of the top sheet within the non-effective region is removed from the base sheet.

In some cases, a portion of the top sheet within the non-effective region is not successfully removed from the base sheet depending on the shape of a target object. This may split or tear the target object. To prevent the target object from splitting and tearing, a cut is made on a portion of the top sheet within the non-effective region. Such a cut will hereinafter be referred to as a "cutting line".

FIG. 19 illustrates a sheet 205 known in the related art. The sheet 205 in this example includes a top sheet 253 on which a target object 254 is located. The top sheet 253 is provided with a cutting line 260. A region 259 surrounded by an outline 258 of the target object 254 and the cutting line 260 is a tapered region. A cutting apparatus makes a cut along the outline 258 and the cutting line 260 surrounding the tapered region 259 of the top sheet 253. When a cutter of the cutting apparatus makes a cut, however, a force applied to the cutter may cause a portion of the top sheet 253 within the tapered region 259 to be pulled. This may unfortunately tear the top sheet 253, resulting in breakage of the target object 254 on the top sheet 253.

SUMMARY OF THE INVENTION

Accordingly, preferred embodiments of the present invention provide cutting line positioning apparatuses, cutting systems, non-transitory computer-readable storage media storing a cutting line positioning computer program, and cutting line positioning methods that place a cutting line at a location on a sheet to be cut by a cutting apparatus where breakage of the sheet is prevented when a cut is made by the cutting apparatus.

A preferred embodiment of the present invention provides a cutting line positioning apparatus to decide a location of a cutting line on a sheet. The sheet includes a base sheet and a top sheet. The top sheet is affixed with an adhesive material to a surface of the base sheet and has a target object located thereon. The cutting line serves as a reference line when a cut is made on the top sheet. The top sheet is cut along an outline of the target object on the top sheet by a cutting apparatus. The top sheet includes an effective region and a non-effective region. The effective region is a region of the top sheet to be left on the base sheet. The non-effective region is a region of the top sheet to be removed from the base sheet. The positioning apparatus includes a cutting line setting processor, a first determination processor, and a shape change processor. The cutting line setting processor is configured or programmed to set the cutting line such that the cutting line extends in a predetermined direction from a first endpoint and the cutting line is located within the non-effective region. The first endpoint is a predetermined point on the outline of the target object. The first determination processor is configured or programmed to determine whether a first angle is equal to or smaller than a predetermined determination angle. The first angle is defined between the outline of the target object and the cutting line, with the first endpoint located at an intersection of the outline and the cutting line. The determination angle is an acute angle. The shape change processor is configured or programmed to, when the first angle is determined to be equal to or smaller than the determination angle by the first determination processor, change a shape of the cutting line such that the first angle is greater than the determination angle.

When the first angle between the cutting line set by the cutting line setting processor and the outline of the target object is small (i.e., when the first angle is equal to or smaller than the predetermined determination angle), the positioning apparatus changes the shape of the cutting line such that the first angle is increased (i.e., such that the first angle is greater than the predetermined determination angle). Thus, a region of the top sheet surrounded by the outline of the target object and the cutting line and having the first angle between the outline and the cutting line will not be a tapered region where the first angle is equal to or smaller than the predetermined determination angle. Accordingly, the region surrounded by the outline of the target object and the cutting line is unlikely to be broken when a cut is made along the outline and the cutting line by the cutting apparatus. Consequently, this preferred embodiment prevents breakage of the sheet when a cut is made along the outline and the cutting line by the cutting apparatus.

Another preferred embodiment of the present invention provides a cutting line positioning method for deciding a location of a cutting line on a sheet. The sheet includes a base sheet and a top sheet. The top sheet is affixed with an adhesive material to a surface of the base sheet and has a target object located thereon. The cutting line serves as a reference line when a cut is made on the top sheet. The top sheet is cut along an outline of the target object on the top sheet by a cutting apparatus. The top sheet includes an effective region and a non-effective region. The effective region is a region of the top sheet to be left on the base sheet.

The non-effective region is a region of the top sheet to be removed from the base sheet. The method includes a cutting line setting step, a first determination step, and a shape change step. The cutting line setting step includes setting the cutting line such that the cutting line extends in a predetermined direction from a first endpoint and the cutting line is located within the non-effective region. The first endpoint is a predetermined point on the outline of the target object. The first determination step includes determining whether a first angle is equal to or smaller than a predetermined determination angle. The first angle is defined between the outline of the target object and the cutting line, with the first endpoint located at an intersection of the outline and the cutting line. The determination angle is an acute angle. The shape change step includes, when the first angle is determined to be equal to or smaller than the determination angle in the first determination step, changing a shape of the cutting line such that the first angle is greater than the determination angle.

The preferred embodiments of the present invention place the cutting line at a location on the sheet where breakage of the sheet is prevented when a cut is made by the cutting apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Cutting systems including cutting line positioning apparatuses according to preferred embodiments of the present invention will be described below with reference to the drawings. In the following description, a cutting line positioning apparatus may simply be referred to as a "positioning apparatus". The preferred embodiments described below are naturally not intended to limit the present invention in any way. Components or elements having the same functions are identified by the same reference signs, and description thereof will be simplified or omitted when deemed redundant.

First Preferred Embodiment

Figure 1:
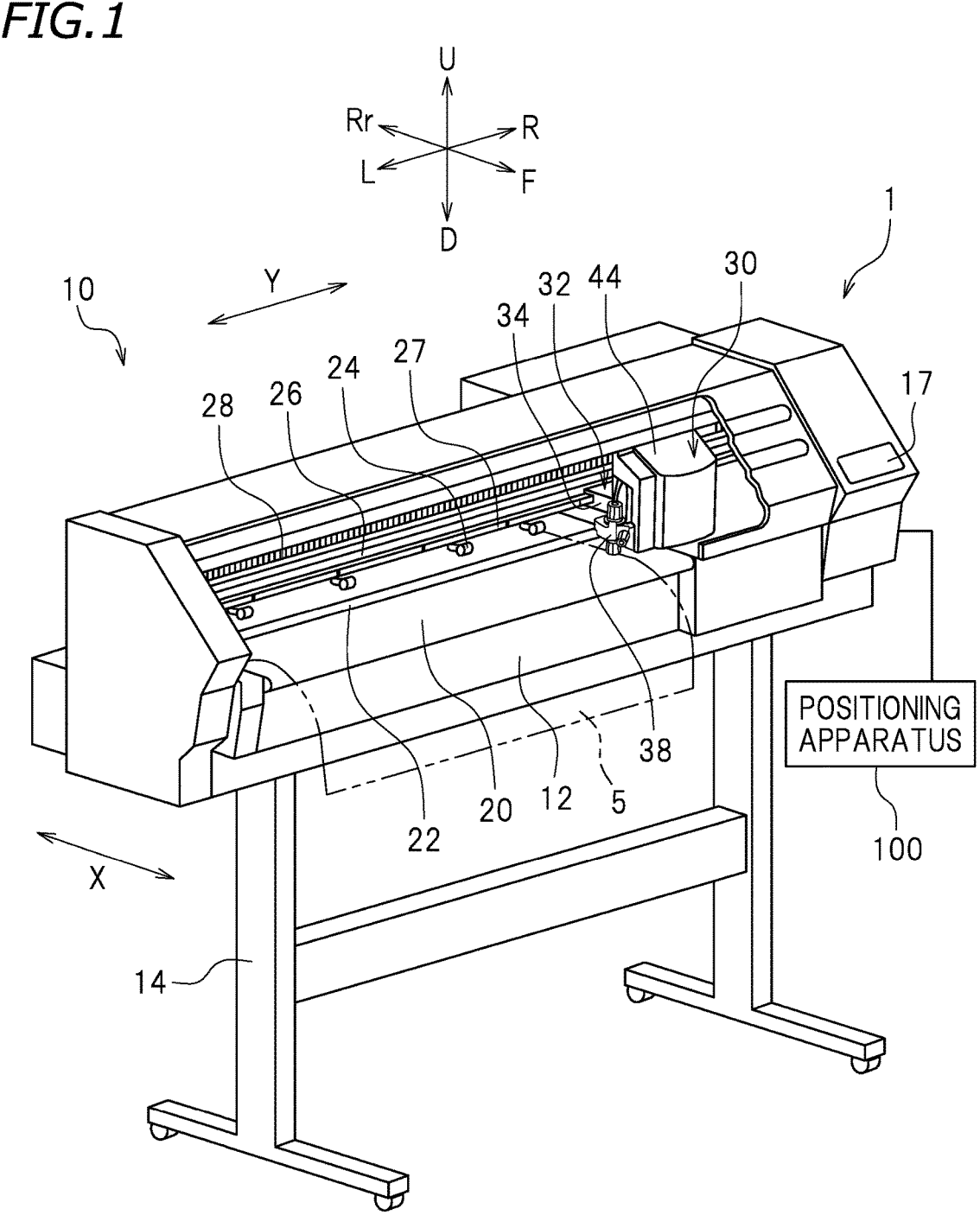
FIG. 1 is a perspective view of a cutting apparatus of a cutting system according to a first preferred embodiment of the present invention.

FIG. 1 is a schematic diagram illustrating a cutting system 1 according to a first preferred embodiment of the present invention. More specifically, FIG. 1 is a perspective view of a cutting apparatus 10 included in the cutting system 1. The following description is based on the assumption that when a user faces the front of the cutting apparatus 10, a direction from the rear of the cutting apparatus 10 toward the user is a forward direction and a direction from the user toward the rear of the cutting apparatus 10 is a rearward direction. The terms "right", "left", "up", and "down" respectively refer to right, left, up, and down with respect to the user facing the front of the cutting apparatus 10. The reference signs F, Rr, R, L, U, and D in the drawings respectively represent front, rear, right, left, up, and down. These directions are defined merely for the sake of convenience of description and do not limit in any way how the cutting system 1 may be installed. The reference sign Y represents a main scanning direction. The reference sign X represents a sub-scanning direction perpendicular to the main scanning direction Y in a plan view. The main scanning direction Y and the sub-scanning direction X are not limited to any particular directions but may be any suitable directions.

As illustrated in FIG. 1, the cutting system 1 includes the cutting apparatus 10 and a cutting line positioning apparatus 100. The cutting apparatus 10 cuts a sheet 5 into a desired shape. The sheet 5 is to be used as a label or a sticker, for example. In the present preferred embodiment, the cutting apparatus 10 includes a body 12, a platen 20, a grit roller 22, a plurality of pinch rollers 24, a guide rail 26, a belt 28, and a cutting head 30.

The body 12 extends in the main scanning direction Y. In the present preferred embodiment, the body 12 is supported by a stand 14. The right portion of the body 12 is provided with an operation panel 17. The operation panel 17 presents the status of the cutting apparatus 10 and information on cutting, for example.

The platen 20 is disposed in the body 12. The sheet 5 is placed on the platen 20. The platen 20 is provided with the grit roller 22 having a cylindrical shape. The grit roller 22 is embedded in the platen 20 such that the upper surface portion of the grit roller 22 is exposed. The grit roller 22 defines and functions as a feeder to move the sheet 5 in the sub-scanning direction X. The grit roller 22 is connected with a feed motor 22a (see FIG. 4). The grit roller 22 is driven by the feed motor 22a. The plurality of pinch rollers 24 are disposed above the grit roller 22. The pinch rollers 24 face the grit roller 22 in the up-down direction. The positions of the pinch rollers 24 in the up-down direction are adjustable in accordance with the thickness of the sheet 5. In the present preferred embodiment, the sheet 5 is sandwiched between the grit roller 22 and the pinch rollers 24. The grit roller 22 and the pinch rollers 24 convey the sheet 5 in the sub-scanning direction X, with the sheet 5 sandwiched between the grit roller 22 and the pinch rollers 24.

The guide rail 26 is provided in the body 12. The guide rail 26 is disposed above the platen 20. The guide rail 26 is disposed in parallel or substantially in parallel with the platen 20. The guide rail 26 extends in the main scanning direction Y. In the present preferred embodiment, the guide rail 26 includes an engagement portion 27 protruding forward.

The belt 28 is disposed in the body 12. The belt 28 is an endless belt. The belt 28 extends in the main scanning direction Y. In the present preferred embodiment, the right and left ends of the belt 28 are each wound around an associated one of first and second pulleys (not illustrated). The first pulley is connected to a drive motor 28a (see FIG. 4) to drive the first pulley. The drive motor 28a is connected to the belt 28 through the first pulley. Rotation of the drive motor 28a rotates the first pulley so as to cause the belt 28 to run in the main scanning direction Y. In the present preferred embodiment, a carriage 32 (which will be described below) is secured to the belt 28. Rotation of the drive motor 28a enables movement of the carriage 32 relative to the sheet 5 in the main scanning direction Y.

Figure 2:
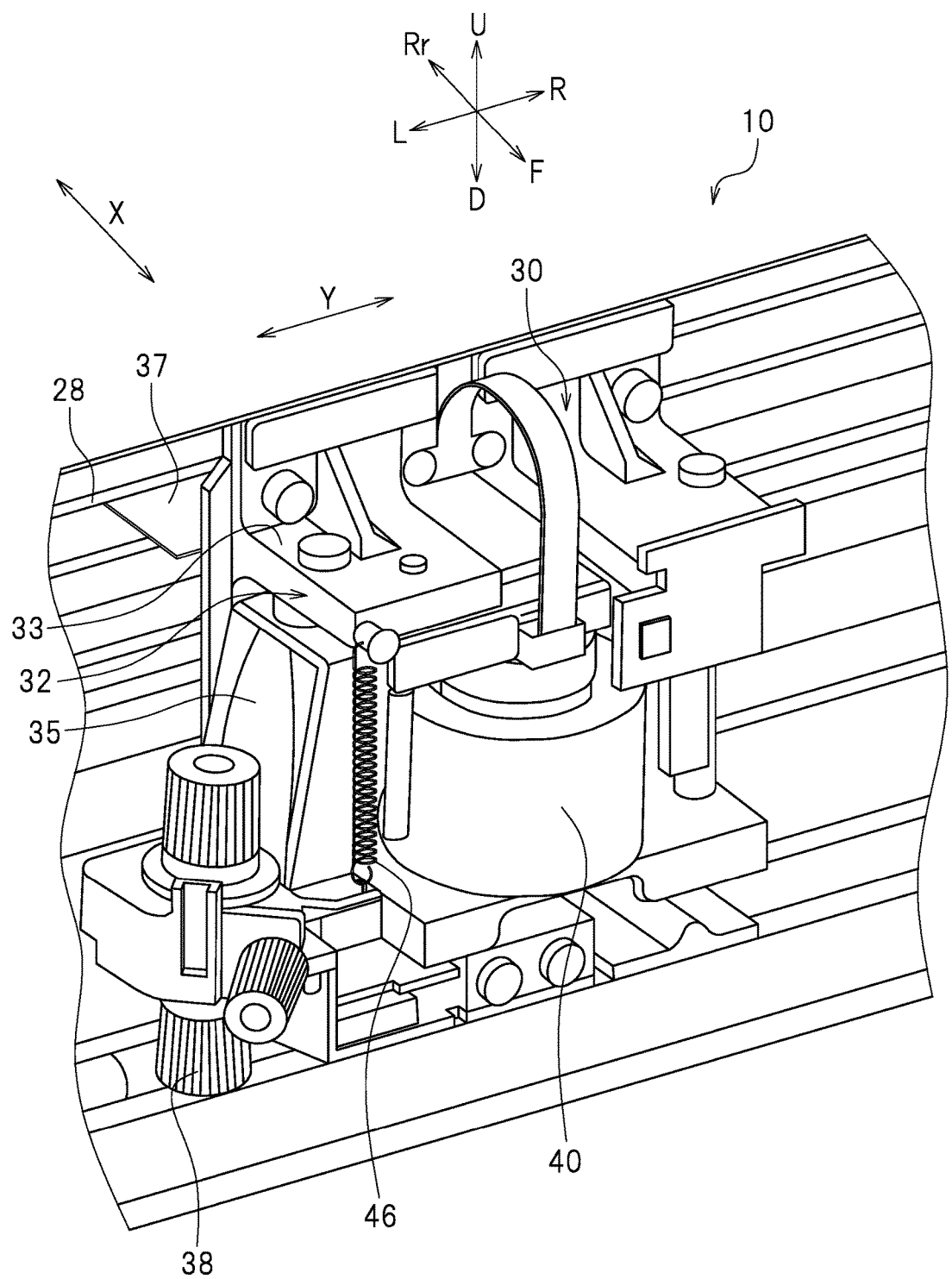
FIG. 2 is a perspective view of a cutting head.

The cutting head 30 is movable in the main scanning direction Y along the guide rail 26. The cutting head 30 cuts the sheet 5. FIG. 2 is a perspective view of the cutting head 30. FIG. 2 illustrates the cutting head 30 from which a cover 44 (see FIG. 1) is detached. As illustrated in FIG. 2, the cutting head 30 includes the carriage 32, a cutter 38, and a cylindrical voice coil motor 40.

The carriage 32 supports a holder 35 (which will be described below). The carriage 32 is movable relative to the sheet 5. The carriage 32 is supported by the guide rail 26 (FIG. 1) such that the carriage 32 is slidable along the guide rail 26. The carriage 32 is secured to the belt 28. Running the belt 28 moves the carriage 32 in the main scanning direction Y along the guide rail 26. The cutter 38 and the voice coil motor 40 move in the main scanning direction Y together with the carriage 32. The carriage 32 includes a carriage base 33 supporting the cutter 38 and the voice coil motor 40.

The carriage 32 further includes a guide 34 (see FIG. 1) and a secured plate 37. As illustrated in FIG. 1, the guide 34 is in engagement with the engagement portion 27 of the guide rail 26. The guide 34 is slidable along the guide rail 26. As illustrated in FIG. 2, the secured plate 37 is secured to the belt 28. The guide 34 and the carriage base 33 are secured to each other with a bolt, for example.

The voice coil motor 40 is mounted on the carriage 32. The voice coil motor 40 is supported by the carriage base 33. The voice coil motor 40 is coupled to the holder 35. The voice coil motor 40 exerts a force on the holder 35 at least in a direction in which the holder 35 comes closer to the sheet 5 (see FIG. 1). In the present preferred embodiment, the voice coil motor 40 exerts an upward force or a downward force on the holder 35. The voice coil motor 40 is able to change the magnitude of the force to be exerted on the holder 35 in accordance with a signal (i.e., a current signal) supplied to the voice coil motor 40. The voice coil motor 40 included in the present preferred embodiment may be a voice coil motor known in the related art, for example.

The cutter 38 is mounted on the carriage 32. The cutter 38 is held by the holder 35 movable in the up-down direction. The holder 35 supports the cutter 38 such that the cutter 38 is movable toward and away from the sheet 5 (see FIG. 1). In the present preferred embodiment, the cutter 38 is disposed leftward of the holder 35. The position of the cutter 38, however, is not limited to any particular position. A spring 46 is provided between the holder 35 and the carriage base 33. The spring 46 exerts an upwardly urging force on the holder 35. The cutter 38 held by the holder 35 is movable in the up-down direction upon receiving a driving force from the voice coil motor 40.

Figure 3:
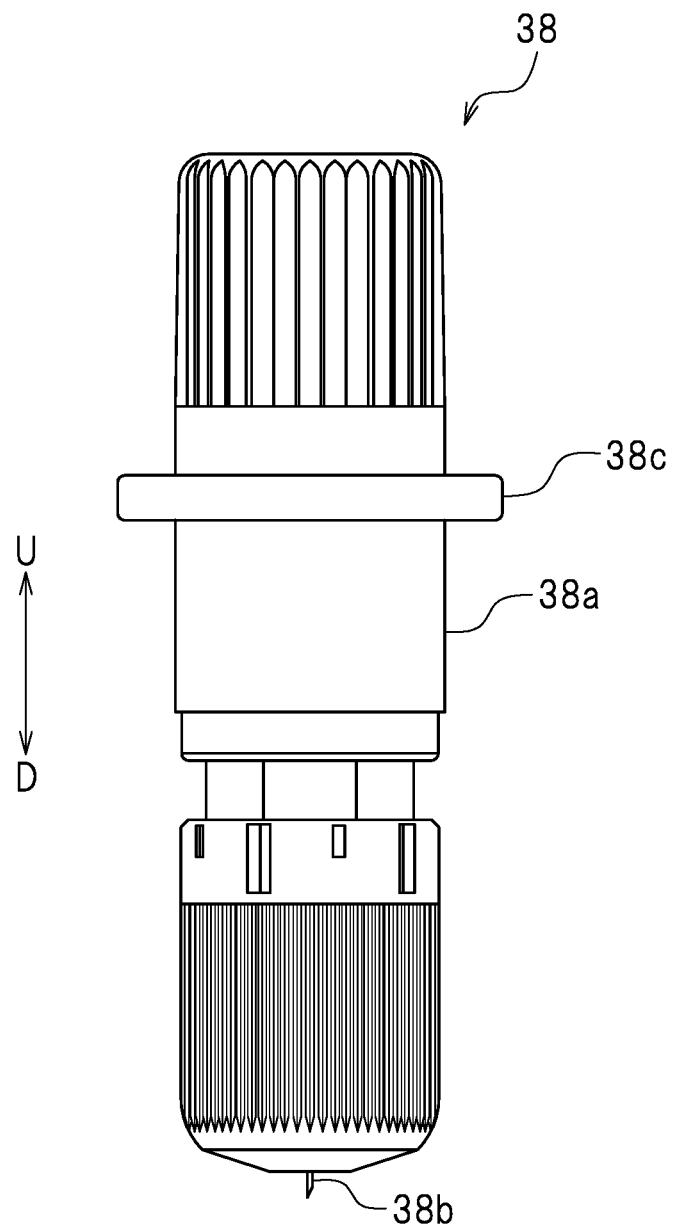
FIG. 3 is a front view of a cutter.

FIG. 3 is a front view of the cutter 38. As illustrated in FIG. 3, the cutter 38 has a rod shape and extends in the up-down direction. The cutter 38 includes a body 38a held by the holder 35 (see FIG. 2), a cutting edge 38b secured to the lower end of the body 38a, and a flange 38c provided on the body 38a. The sheet 5 (see FIG. 1) is cut by the cutting edge 38b of the cutter 38. As previously mentioned, the cutter 38 moves in the main scanning direction Y together with the carriage 32. Thus, the cutting edge 38b of the cutter 38 moves in the main scanning direction Y.

As illustrated in FIG. 1, the cover 44 may be attached to the carriage 32. The cover 44 covers at least a portion of the carriage 32. Providing the cover 44 in this manner prevents chips produced during cutting from intruding into the carriage 32.

When the cutting apparatus 10 cuts the sheet 5 as illustrated in FIG. 1, the position of the cutting edge 38b (see FIG. 3) of the cutter 38 in the up-down direction is adjusted by the voice coil motor 40 (see FIG. 2). After the position of the cutting edge 38b in the up-down direction has been adjusted, the sheet 5 is moved in the sub-scanning direction X by the grit roller 22 (see FIG. 1) described above, while the cutting edge 38b is moved in the main scanning direction Y by the drive motor 28a (see FIG. 4). Thus, the sheet 5 is cut into a desired shape.

Figure 4:
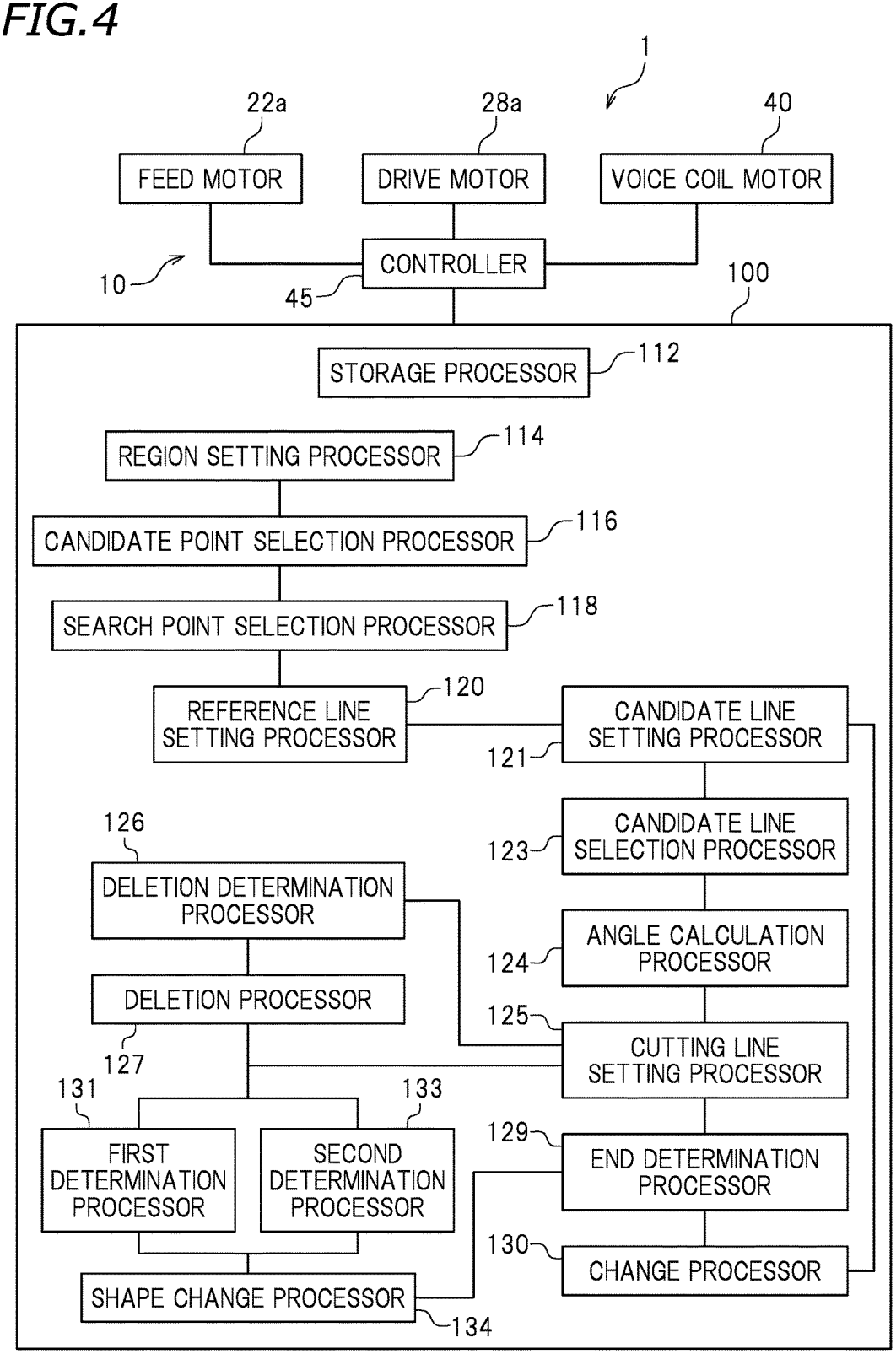
FIG. 4 is a block diagram of the cutting system.

FIG. 4 is a block diagram of the cutting system 1. As illustrated in FIG. 4, the cutting apparatus 10 includes a controller 45. The controller 45 is connected to the feed motor 22a connected to the grit roller 22. The controller 45 drives the feed motor 22a so as to drive the grit roller 22. This moves the sheet 5 in the sub-scanning direction X. The controller 45 is connected to the drive motor 28a to cause the belt 28 to run in the main scanning direction Y. The controller 45 drives the drive motor 28a so as to cause the belt 28 to run. This causes the carriage 32 secured to the belt 28 to move in the main scanning direction Y. The controller 45 is connected to the voice coil motor 40. The controller 45 controls driving of the voice coil motor 40 so as to control the up-down movement of the holder 35 (see FIG. 2) coupled to the voice coil motor 40 and the up-down movement of the cutter 38 (see FIG. 2) held by the holder 35. The controller 45 is not limited to any particular configuration. In one example, the controller 45 is a computer including a central processing unit (CPU), a read-only memory (ROM) storing, for example, a program to be executed by the CPU, and a random-access memory (RAM).

Figure 5:
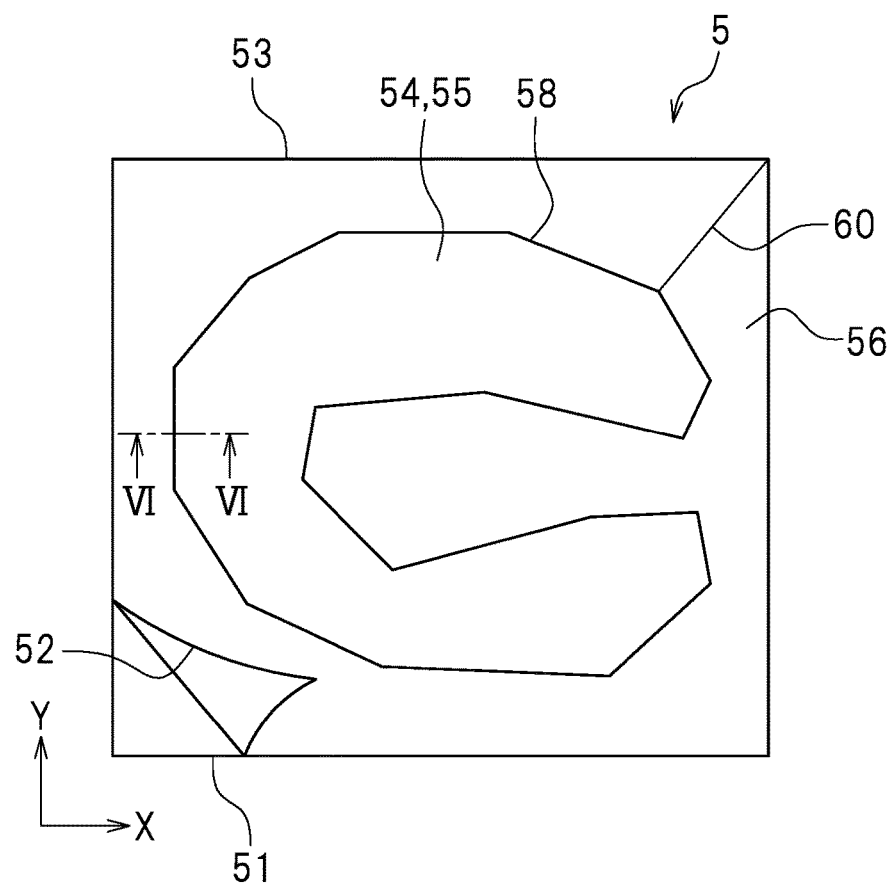
FIG. 5 is a schematic diagram illustrating a sheet.
Figure 6:
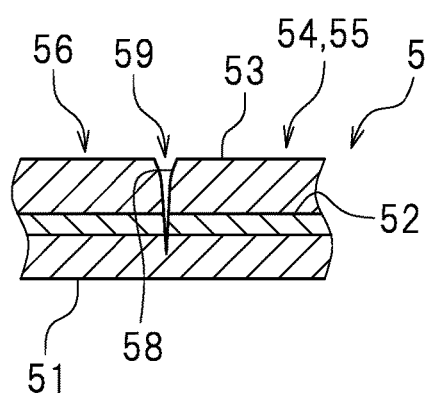
FIG. 6 is a cross-sectional view of the sheet taken along the line VI-VI in FIG. 5.

Examples of the sheet 5 to be cut by the cutting apparatus 10 include a label and a sticker. FIG. 5 is a schematic diagram illustrating the sheet 5. FIG. 6 is a cross-sectional view of the sheet 5 taken along the line VI-VI in FIG. 5. As illustrated in FIG. 5, the sheet 5 includes a base sheet 51 and a top sheet 53. The top sheet 53 is affixed to a surface of the base sheet 51 with an adhesive material 52 (see FIG. 6), such as an adhesive agent. A desired target object 54 is located on the top sheet 53. The top sheet 53 includes an effective region 55 and a non-effective region 56. The effective region 55 and the non-effective region 56 are defined by an outline 58 of the target object 54 serving as a boundary between the effective region 55 and the non-effective region 56. The effective region 55 is a region of the top sheet 53 to be left on the base sheet 51. The effective region 55 is a necessary region on which the target object 54, for example, is located. The non-effective region 56 is a region of the top sheet 53 to be removed from the base sheet 51. The non-effective region 56 is a region of the top sheet 53 other than the effective region 55. The non-effective region 56 is an unnecessary region. A portion of the top sheet 53 within the non-effective region 56 will undergo disposal. Alternatively, the effective region 55 may be a region of the top sheet 53 other than the target object 54. In such a case, the non-effective region 56 is a region of the top sheet 53 on which the target object 54 is located. A portion of the top sheet 53 within the effective region 55 may be referred to as a "target object sheet" when deemed appropriate. A portion of the top sheet 53 within the non-effective region 56 may be referred to as an "unnecessary sheet" when deemed appropriate.

In the present preferred embodiment, a cut is made along the outline 58 of the target object 54 on the sheet 5. As used herein, the term "cut" refers to a cut 59. As illustrated in FIG. 6, the cut 59 has a depth from the surface of the top sheet 53 to an upper portion of the base sheet 51. The cut 59 is made by the cutting apparatus 10. In the present preferred embodiment, making the cut 59 along the outline 58 enables the effective region 55 and the non-effective region 56 to be separated from each other. Making the cut 59 along the outline 58 also allows only a portion of the top sheet 53 within the non-effective region 56 (i.e., the unnecessary sheet) to be removed from the base sheet 51, with a portion of the top sheet 53 within the effective region 55 (i.e., the target object sheet) remaining on the base sheet 51.

In the present preferred embodiment, a cut is made on the top sheet 53 in addition to the cut 59 made along the outline 58. This additional cut will be referred to as a "cutting line 60". The cutting line 60 serves to facilitate successful removal of the unnecessary sheet within the non-effective region 56 from the base sheet 51. Referring to FIG. 5, the cutting line 60 is located within the non-effective region 56 of the top sheet 53. If no cutting line 60 is provided, a portion of the top sheet 53 within the non-effective region 56 may not be successfully removed from the base sheet 51 depending on the shape of the target object 54. This may split or tear a portion of the top sheet 53 within the effective region 55 (i.e., the target object sheet). Accordingly, the cutting line 60 is provided on a portion of the top sheet 53 within the non-effective region 56 in order to prevent the target object sheet from splitting and tearing.

Figure 7:
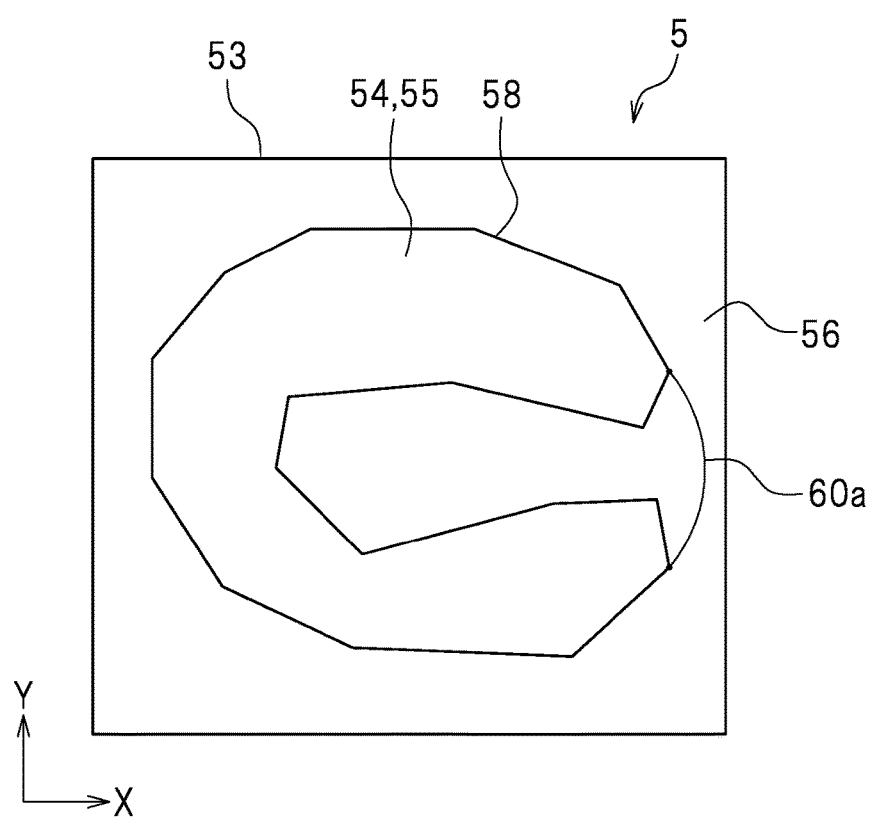
FIG. 7 is a diagram illustrating a location of a lasso cutting line.

Examples of such a cutting line include a "lasso cutting line". FIG. 7 is a schematic diagram illustrating the sheet 5. FIG. 7 illustrates a location of a lasso cutting line 60a. As illustrated in FIG. 7, the lasso cutting line 60a connects predetermined points on the outline 58 of the target object 54 and is located to surround the effective region 55 together with a portion of the outline 58 of the target object 54. In the present preferred embodiment, the lasso cutting line 60a surrounds the target object 54 together with a portion of the outline 58 of the target object 54. The lasso cutting line 60a forms a loop together with a portion of the outline 58 of the target object 54. Providing the lasso cutting line 60a on the sheet 5 illustrated in FIG. 7, for example, enables portions of the top sheet 53 within the non-effective region 56 to be removed at two different times. First, a portion of the top sheet 53 located within the non-effective region 56 and outward of the lasso cutting line 60a (i.e., an outer edge portion of the top sheet 53) is removed from the base sheet 51. Subsequently, a portion of the top sheet 53 located within the non-effective region 56, inward of the lasso cutting line 60a, and surrounded by the lasso cutting line 60a and the outline 58 is removed from the base sheet 51. Placing the lasso cutting line 60a as illustrated in FIG. 7 enables removal of a portion of the top sheet 53 located within the non-effective region 56 and outward of the lasso cutting line 60a, and then enables removal of a portion of the top sheet 53 located within the non-effective region 56 and having a complicated shape. Thus, the lasso cutting line 60a facilitates removal of the portions of the top sheet 53 within the non-effective region 56 from the base sheet 51.

In the present preferred embodiment, the cutting line positioning apparatus 100 automatically places a cutting line, such as the lasso cutting line 60a, on the top sheet 53 of the sheet 5. The cutting apparatus 10 then makes a cut along the cutting line placed by the positioning apparatus 100.

The cutting line positioning apparatus 100 will be described in detail below. As illustrated in FIG. 4, the positioning apparatus 100 may be separate from the cutting apparatus 10 or may be built into the cutting apparatus 10. The positioning apparatus 100 is electrically and communicably connected to the controller 45 of the cutting apparatus 10. In one example, the positioning apparatus 100 may be a computer including a central processing unit (CPU), a read-only memory (ROM) storing, for example, a program to be executed by the CPU, and a random-access memory (RAM). The present preferred embodiment includes using a program stored in a computer so as to decide a location of a lasso cutting line. The positioning apparatus 100 may be implemented by a computer dedicated to the cutting system 1 or may be implemented by a general-purpose computer.

In the present preferred embodiment, the positioning apparatus 100 includes a storage processor 112, a region setting processor 114, a candidate point selection processor 116, a search point selection processor 118, a reference line setting processor 120, a candidate line setting processor 121, a candidate line selection processor 123, an angle calculation processor 124, a cutting line setting processor 125, a deletion determination processor 126, a deletion processor 127, an end determination processor 129, a change processor 130, a first determination processor 131, a second determination processor 133, and a shape change processor 134. The processors of the positioning apparatus 100 may be implemented by software or hardware. The processors of the positioning apparatus 100 may be built into circuit(s). Specific functions of the processors mentioned above will be described below.

The following description discusses a procedure for deciding a location of a lasso cutting line. The lasso cutting line location deciding procedure will be first briefly described, and then the steps of the procedure will be described in detail.

Figure 9:
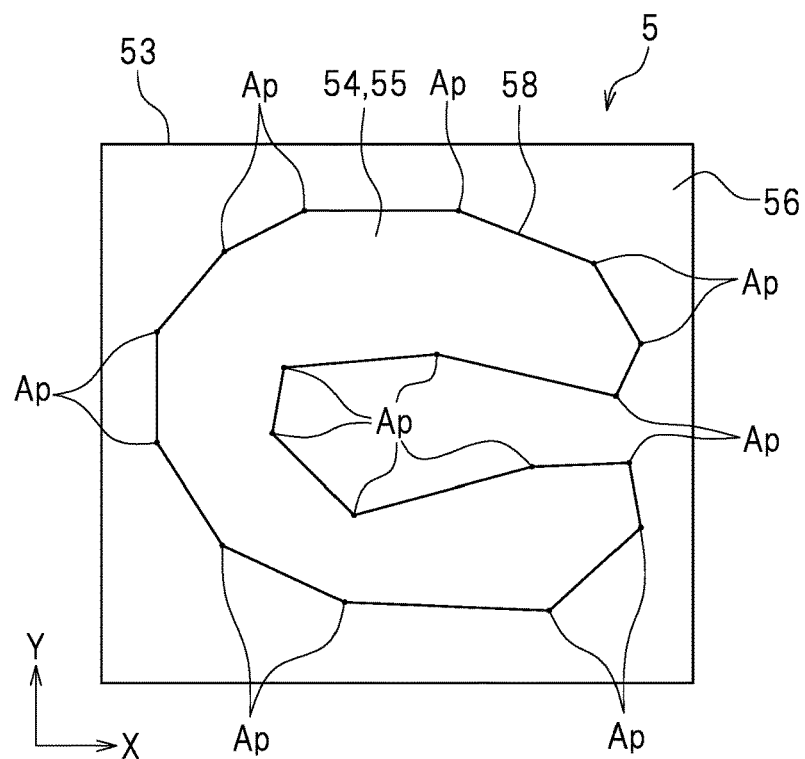
FIG. 9 is a schematic diagram of a top sheet, illustrating the lasso cutting line location deciding procedure.

As illustrated in FIG. 9, the outline 58 is represented as a polyline in the present preferred embodiment. As used herein, the term "polyline" refers to a collection of a plurality of continuous line segments. Connecting vertices provides line segments continuous with each other. In the present preferred embodiment, vertices that will be endpoints of a lasso cutting line (which may hereinafter be referred to as "selected vertices") are selected from vertices obtained when the outline 58 is represented as a polyline (which may hereinafter be referred to as "polyline vertices"). A line provided by connecting adjacent selected vertices on the outline 58 in a predetermined circumferential direction (e.g., in a clockwise direction) is determined to be a lasso cutting line. Such a procedure places a lasso cutting line that surrounds the effective region 55 together with a portion of the outline 58 of the target object 54.

Figure 8:
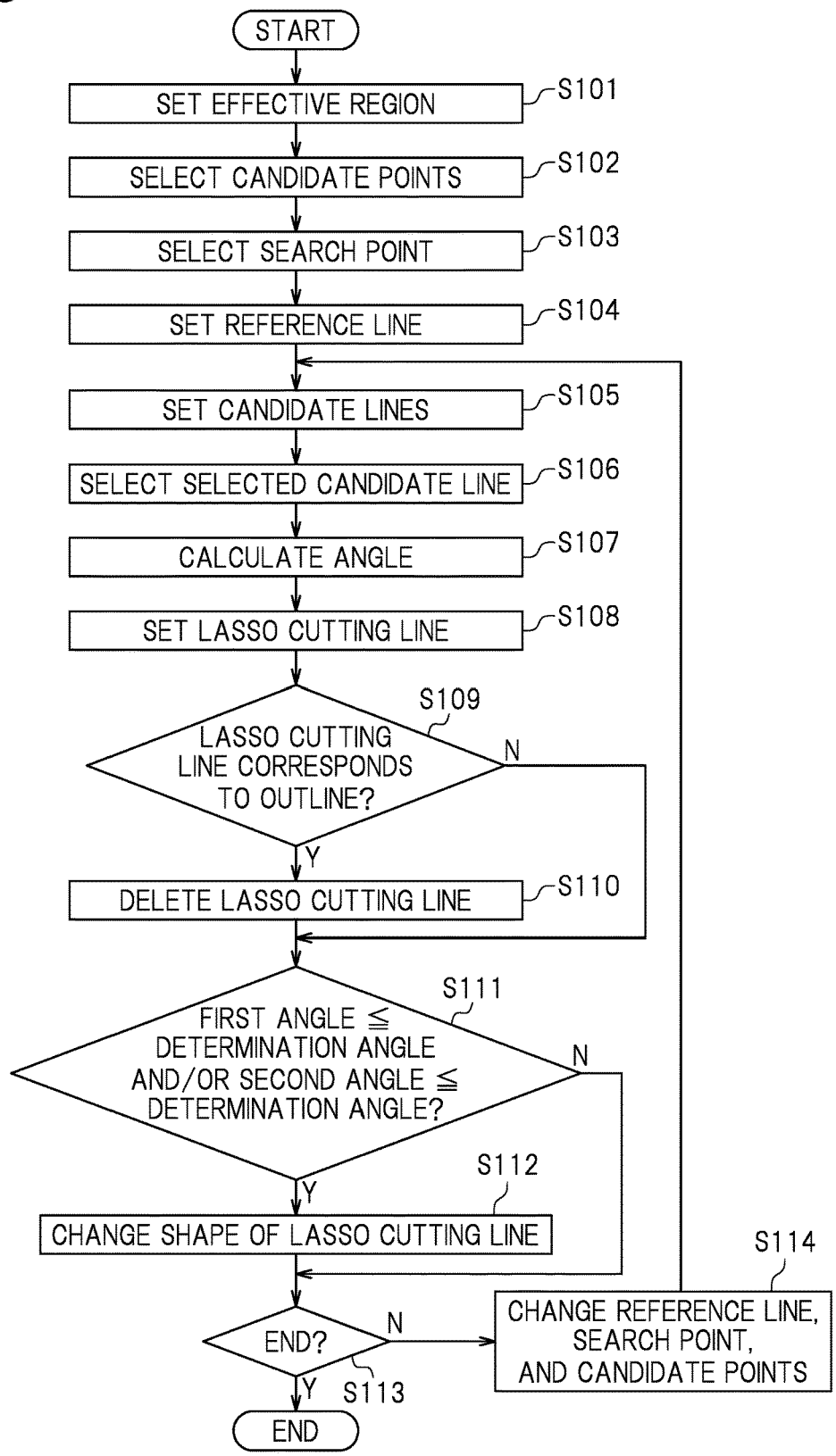
FIG. 8 is a flow chart illustrating a procedure for deciding a location of a lasso cutting line.

FIG. 8 is a flow chart illustrating the lasso cutting line location deciding procedure. As illustrated in FIG. 7, a portion of the top sheet 53 within a region where the target object 54 is located is a necessary sheet. Referring to the flow chart of FIG. 8, the following description discusses in detail how a lasso cutting line is placed such that the lasso cutting line surrounds the target object 54 together with a portion of the outline 58. In the following description, the top sheet 53 is image data of the top sheet 53. The following description is based on the assumption that the top sheet 53 is located on an X-Y coordinate system.

First, in step S101 in FIG. 8, the region setting processor 114 sets the effective region 55 selected from regions of the top sheet 53 as illustrated in FIG. 9. A region of the top sheet 53 other than the effective region 55 is set to be the non-effective region 56. In the present preferred embodiment, a lasso cutting line is located within the non-effective region 56. The effective region 55 may be set in any suitable manner. In one example, the user may select the effective region 55 using a user interface (UI) provided on the operation panel 17 (see FIG. 1). In such an example, a region selected by the user is set to be the effective region 55 by the region setting processor 114, and a region other than the effective region 55 selected by the user is set to be the non-effective region 56 by the region setting processor 114. In the present preferred embodiment, a region including the target object 54 is set to be the effective region 55. Information on the effective region 55 and the non-effective region 56 is stored in the storage processor 112.

In step S102 in FIG. 8, the candidate point selection processor 116 selects candidate points that may each serve as an endpoint of a lasso cutting line. As illustrated in FIG. 9, the candidate point selection processor 116 presents the outline 58 in the form of a polyline. In other words, the candidate point selection processor 116 presents the outline 58 in the form of a plurality of continuous line segments. Polyline vertices on the outline 58 that are obtained when the outline 58 is represented as a polyline are set to be candidate points Ap by the candidate point selection processor 116. All the polyline vertices on the outline 58 illustrated in FIG. 9 are the candidate points Ap.

Figure 10:
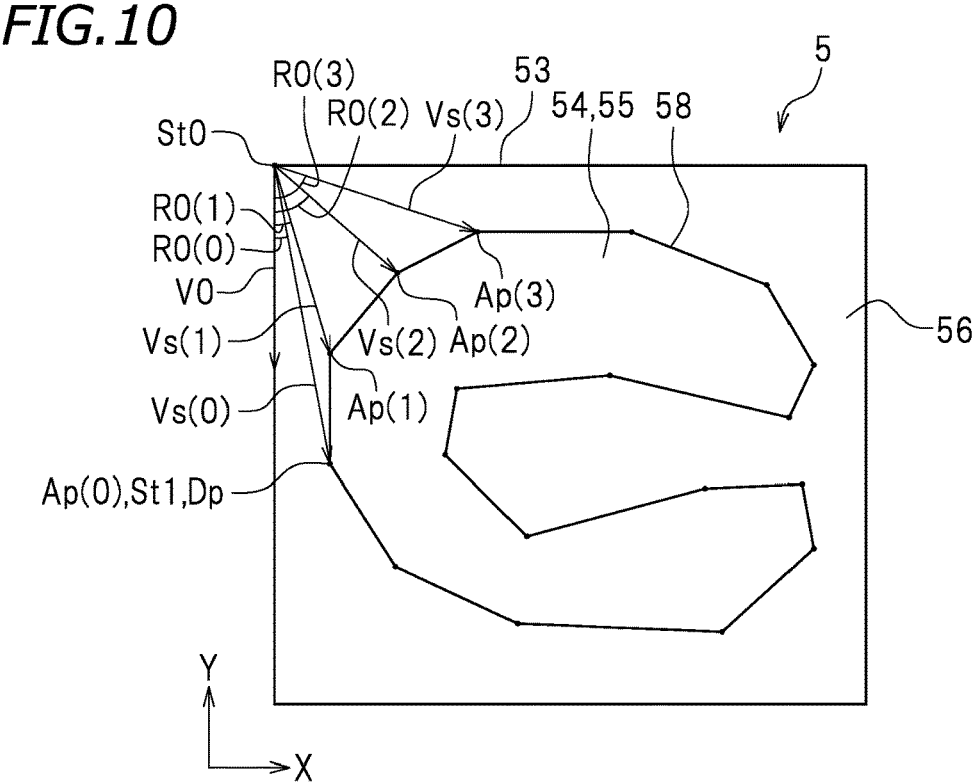
FIG. 10 is a schematic diagram of the top sheet, illustrating the lasso cutting line location deciding procedure.

In step S103 in FIG. 8, the search point selection processor 118 selects a search point St1 from which a search starts as illustrated in FIG. 10. In the present preferred embodiment, the search point selection processor 118 selects an end determination point Dp in addition to selecting the search point St1. The search point St1 is a reference point to be used to search for a point that serves as an endpoint of a lasso cutting line. The search point St1 is one of the candidate points Ap (see FIG. 9) on the outline 58. The end determination point Dp is used to determine end of the procedure in step S113 (which will be described below) in FIG. 8. In the present preferred embodiment, the search point St1 is identical to the end determination point Dp. The search point St1 and the end determination point Dp may be selected in any suitable manner. In one example, the search point St1 and the end determination point Dp may be set in a manner described below.

As illustrated in FIG. 10, a reference point St0 and a reference vector V0 extending in a predetermined direction from the reference point St0 are set in advance on the top sheet 53 in the present preferred embodiment. The positions of the reference point St0 and the reference vector V0 are stored in advance in the storage processor 112. The reference point St0 and the reference vector V0 may be located at any suitable positions. In one example, the reference point St0 is a point located at the upper left end of the top sheet 53 in FIG. 10. The reference vector V0 extends in a predetermined direction from the reference point St0. In the present preferred embodiment, the predetermined direction is a Y coordinate negative direction that is a downward direction in FIG. 10. In FIG. 10, for convenience of description, only some of the candidate points Ap are identified by associated reference signs Ap(0) to Ap(3). The search point selection processor 118 sets vectors Vs(0) to Vs(3) to be search vectors. The vectors Vs(0) to Vs(3) each connect the reference point St0 with an associated one of the candidate points Ap(0) to Ap(3) selected in step S102. Although some of the search vectors are not illustrated in FIG. 10, the search vectors are actually set for all the candidate points Ap.

The search point selection processor 118 calculates search angles R0(0) to R0(3). The search angle R0(0) is defined between the reference vector V0 and the search vector Vs(0). The search angle R0(1) is defined between the reference vector V0 and the search vector Vs(1). The search angle R0(2) is defined between the reference vector V0 and the search vector Vs(2). The search angle R0(3) is defined between the reference vector V0 and the search vector Vs(3). The search angles are calculated for all the search vectors. The search point selection processor 118 subsequently selects the candidate point included in the search vector defining a search angle with the reference vector that is the smallest search angle calculated, and sets the selected candidate point to be the search point St1 and the end determination point Dp. In FIG. 10, the search angle R0(0) is smaller than each of the search angles R0(1) to R0(3), so that the search angle R0(0) is the smallest search angle. Thus, the candidate point Ap(0) that is a candidate point included in the search vector Vs(0) is set to be the search point St1 and the end determination point Dp.

Figure 11:
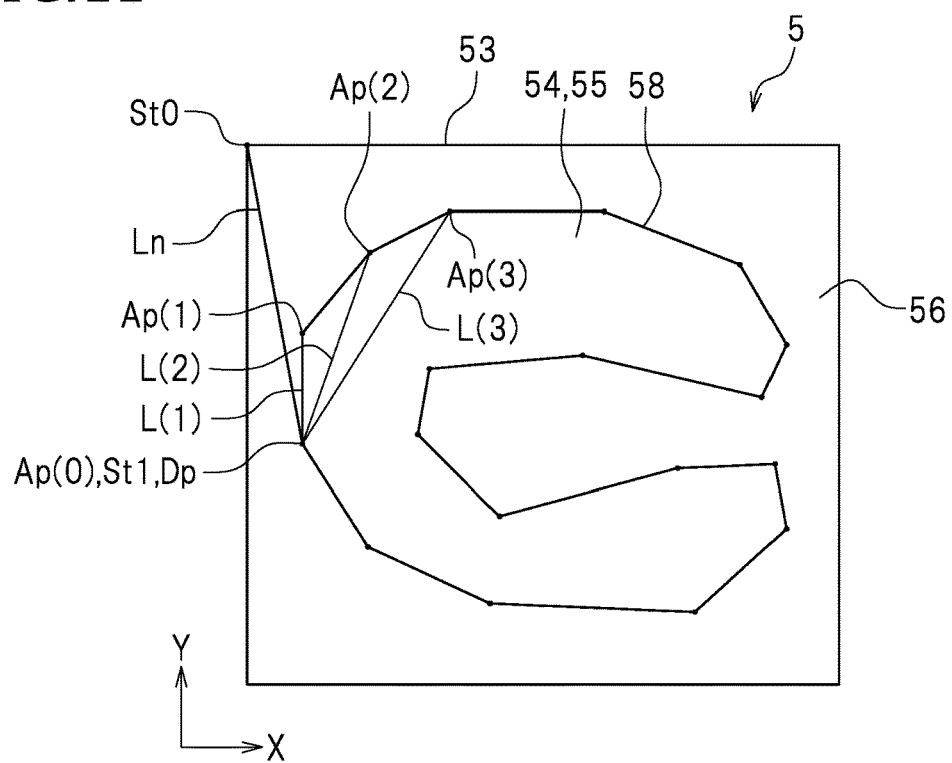
FIG. 11 is a schematic diagram of the top sheet, illustrating the lasso cutting line location deciding procedure.

In step S104 in FIG. 8, the reference line setting processor 120 sets a reference line Ln. As used herein, the term "reference line" refers to a reference line to be used to calculate an angle R1 in step S107 (which will be described below) in FIG. 8. As illustrated in FIG. 11, a line connecting the reference point St0, stored in advance in the storage processor 112, with the search point St1 selected in step S103 is set to be the reference line Ln by the reference line setting processor 120 in the present preferred embodiment.

In step S105 in FIG. 8, the candidate line setting processor 121 sets candidate lines that are candidates for a lasso cutting line. Referring to FIG. 11, the candidate line setting processor 121 sets lines L(1) to L(3) to be the candidate lines. The lines L(1) to L(3) each connect the search point St1 with an associated one of the candidate points Ap(1) to Ap(3) other than the candidate point Ap(0) set to be an endpoint of the reference line Ln. The present preferred embodiment includes setting a plurality of candidate lines in this manner. Although some of the plurality of candidate lines are not illustrated in FIG. 11, the candidate lines are actually set for the candidate points Ap (see FIG. 9) other than the candidate point Ap(0).

In step S106 in FIG. 8, the candidate line selection processor 123 selects a candidate line located only within the non-effective region 56 from the plurality of candidate lines L(1) to L(3). In the example illustrated in FIG. 11, none of the candidate lines L(1) to L(3) is located only within the non-effective region 56. When no candidate line is located only within the non-effective region 56 as in this example, the candidate line selection processor 123 selects a candidate line located on the outline 58 and extending in a predetermined circumferential direction. Specifically, when no candidate line is located only within the non-effective region 56, the candidate line selection processor 123 selects a candidate line that is located on the outline 58 represented as a polyline and extends in the clockwise direction in the present preferred embodiment. The predetermined circumferential direction is stored in advance in the storage processor 112. In FIG. 11, the candidate line L(1) is located on the outline 58, and the candidate lines L(2) and L(3) are at least partially located within the effective region 55. Thus, the candidate line selection processor 123 selects the candidate line L(1). In the present preferred embodiment, the candidate line selected by the candidate line selection processor 123 in step S106 will be referred to as a "selected candidate line".

In step S107 in FIG. 8, the angle calculation processor 124 calculates an angle between the reference line Ln and the selected candidate line selected in step S106. As used herein, the term "angle between the reference line Ln and the selected candidate line" refers to an angle between 0 degrees and 90 degrees inclusive. Referring to FIG. 11, only the line L(1) is selected as the selected candidate line in step S106. In this case, the angle calculation processor 124 calculates an angle between the reference line Ln and the selected candidate line L(1). Alternatively, step S107 may be omitted when a single selected candidate line is selected in step S106.

Figure 12:
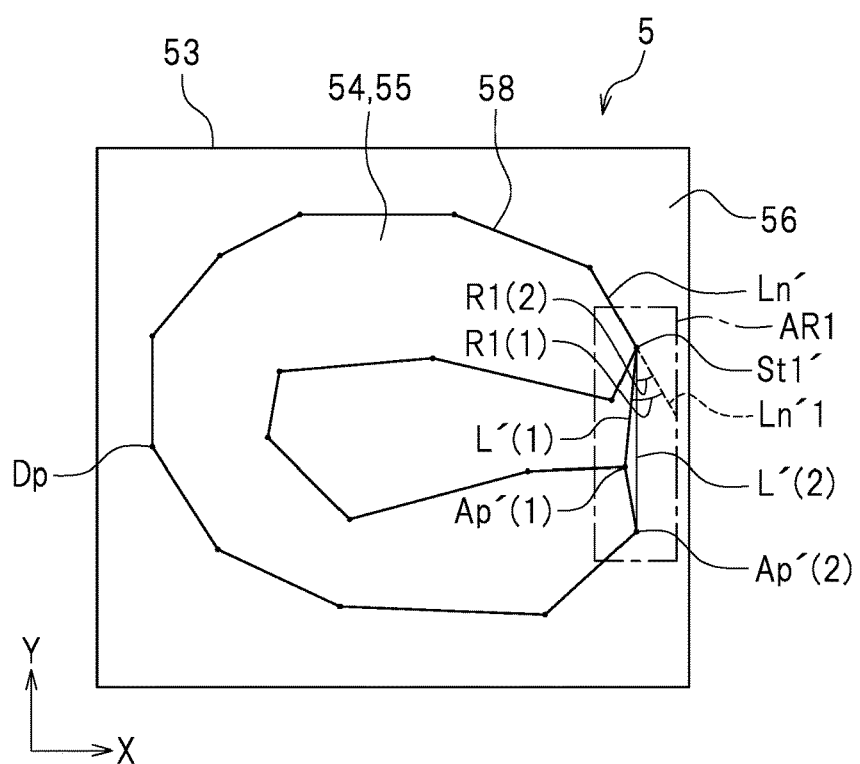
FIG. 12 is a schematic diagram of the top sheet, illustrating the lasso cutting line location deciding procedure.

In the example illustrated in FIG. 12, the reference line is represented as a reference line Ln'. In this example, the candidate line selection processor 123 selects candidate lines L'(1) and L'(2) as the selected candidate lines in step S106. The candidate line L'(1) includes a candidate point Ap'(1), and the candidate line L'(2) includes a candidate point Ap'(2). In the example illustrated in FIG. 12, the angle calculation processor 124 calculates an angle R1(1) between the selected candidate line L'(1) and an extended reference line Ln'1 extended from the reference line Ln', and an angle R1(2) between the selected candidate line L'(2) and the extended reference line Ln'1 extended from the reference line Ln'. When the angle between the reference line Ln' and the selected candidate line L'(1) and the angle between the reference line Ln' and the selected candidate line L'(2) are each greater than 90 degrees as in the example illustrated in FIG. 12, the angle calculation processor 124 calculates the angle R1(1) between the selected candidate line L'(1) and the extended reference line Ln'1 extended from the reference line Ln', and the angle R1(2) between the selected candidate line L'(2) and the extended reference line Ln'1 extended from the reference line Ln'. The angle calculation processor 124 calculates the angles R1(1) and R1(2) on the assumption that the reference line Ln' includes the extended reference line Ln'1. The angles R1(1) and R1(2) calculated by the angle calculation processor 124 are stored in the storage processor 112.

In step S108 in FIG. 8, the cutting line setting processor 125 sets a lasso cutting line. The lasso cutting line set in step S108 is a line connecting the search point St1 with a candidate point that is an endpoint of the selected candidate line defining an angle with the reference line Ln that is the smallest angle calculated in step S107. Referring to FIG. 11, there is only a single selected candidate line that is the candidate line L(1). Thus, a straight line connecting the search point St1 with the candidate point Ap(1) that is an endpoint of the selected candidate line L(1) is set to be a lasso cutting line. In this case, the selected candidate line L(1) is set to be a lasso cutting line.

Figure 13:
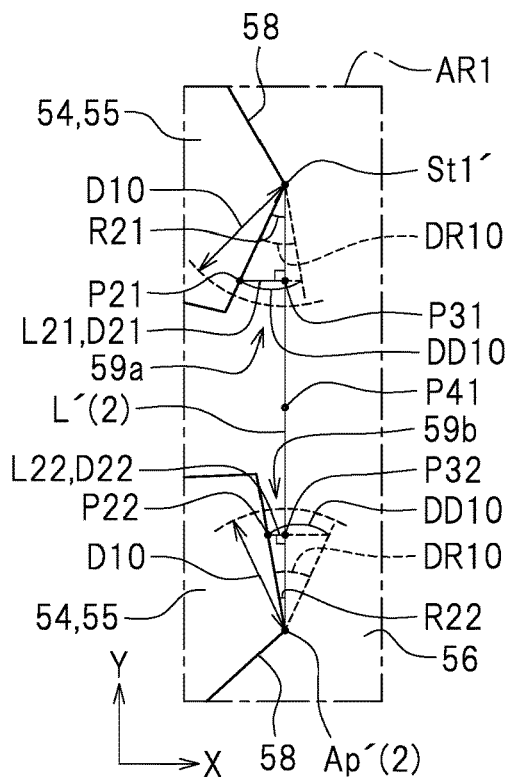
FIG. 13 is an enlarged view of a region AR1 in FIG. 12, illustrating a process for determining the lasso cutting line.

In the example illustrated in FIG. 12, the angle R1(2) is smaller than the angle R1(1). This means that the angle R1(2) is the smallest angle calculated in step S107. In this case, a line connecting a search point St1' with the candidate point Ap'(2) that is an endpoint of the selected candidate line L'(2) having the angle R1(2) is set to be a lasso cutting line by the cutting line setting processor 125. In the example illustrated in FIG. 12, the search point St1' is a predetermined first endpoint, and the candidate point Ap'(2) is a predetermined second endpoint. FIG. 13 is an enlarged view of a region AR1 in FIG. 12. As illustrated in FIG. 13, the line L'(2) connecting the first endpoint St1' with the second endpoint Ap'(2) is set to be a lasso cutting line by the cutting line setting processor 125. In the example illustrated in FIG. 13, a direction extending from the first endpoint St1' to the second endpoint Ap'(2) is an example of a "predetermined direction".

In step S109 in FIG. 8, the deletion determination processor 126 determines whether the lasso cutting line set in step S108 (which immediately precedes step S109) corresponds to the outline 58. In the example illustrated in FIG. 11, the selected candidate line L(1) that is a straight line connecting the candidate point Ap(1) with the search point St1 is set to be a lasso cutting line. The lasso cutting line L(1) corresponds to a portion of the outline 58. In this example, the deletion determination processor 126 determines that the lasso cutting line L(1) corresponds to the outline 58. Then, the procedure goes to step S110. In step S110, the deletion processor 127 deletes the lasso cutting line L(1) set in step S108. Because the lasso cutting line L(1) corresponding to the outline 58 is deleted in this manner, a cut is made only along the outline 58. This prevents a cut from being dually made along the same line.

In the example illustrated in FIG. 12, the selected candidate line L'(2) that is a straight line connecting the candidate point Ap'(2) with the search point St1' is set to be a lasso cutting line. The lasso cutting line L'(2) does not correspond to the outline 58. In this example, the deletion determination processor 126 determines in step S109 that the lasso cutting line L'(2) does not correspond to the outline 58. Then, the procedure goes to step S111.

In step S111 in FIG. 8, the first determination processor 131 and the second determination processor 133 determine whether the lasso cutting line L'(2) set in step S108 is close to the outline 58 of the target object 54. In the present preferred embodiment, the first determination processor 131 determines whether a first angle R21 is equal to or smaller than a determination angle DR10. The first angle R21 is defined between the outline 58 of the target object 54 and the lasso cutting line L'(2), with the first endpoint St1' located at an intersection of the outline 58 and the lasso cutting line L'(2). In the example illustrated in FIG. 13, the second determination processor 133 determines whether a second angle R22 is equal to or smaller than the determination angle DR10. The second angle R22 is defined between the outline 58 and the lasso cutting line L'(2), with the second endpoint Ap'(2) located at an intersection of the outline 58 and the lasso cutting line L'(2). In the present preferred embodiment, the determination angle DR10 is an acute angle. The determination angle DR10 is stored in advance in the storage processor 112 (see FIG. 4). The determination angle DR10 is not limited to any specific numerical value. In one example, the determination angle DR10 assumes a predetermined value greater than 0 degrees and smaller than 45 degrees. Alternatively, the first determination processor 131 and the second determination processor 133 may make determinations in any other specific manners.

In the present preferred embodiment, the first determination processor 131 first sets a predetermined point on the outline 58 to be a first determination point P21. The first determination point P21 is located away from the first endpoint St1' in a predetermined circumferential direction (i.e., in the clockwise direction in the present preferred embodiment) by a predetermined distance D10 or less. The predetermined distance D10 is decided in accordance with the shape and size of the sheet 5 and the shape and size of the target object 54, for example. The predetermined distance D10 is stored in advance in the storage processor 112. The first determination point P21 may be singular or plural in number. The first determination processor 131 then sets a first perpendicular line L21. The first perpendicular line L21 is a straight line passing through the first determination point P21 and perpendicular to the lasso cutting line L'(2). Suppose that a plurality of first determination points P21 are set. In this case, the first perpendicular line L21 is set for each of the first determination points P21. The first determination processor 131 sets an intersection point of the first perpendicular line L21 and the lasso cutting line L'(2) to be a first intersection point P31. The first determination processor 131 subsequently calculates a first determination actual distance D21 that is a distance between the first determination point P21 and the first intersection point P31. The first determination processor 131 determines whether the first determination actual distance D21 is equal to or less than a predetermined determination distance DD10. The predetermined determination distance DD10 is decided in accordance with the shape and size of the sheet 5 and the shape and size of the target object 54, for example. The predetermined determination distance DD10 is stored in advance in the storage processor 112. Upon determining that the first determination actual distance D21 is equal to or less than the predetermined determination distance DD10, the first determination processor 131 determines that the first angle R21 between the outline 58 and the lasso cutting line L'(2) is equal to or smaller than the determination angle DR10.

In the present preferred embodiment, the second determination processor 133 makes determinations in a manner similar to that in which the first determination processor 131 makes determinations. The second determination processor 133 first sets a point on the outline 58 to be a second determination point P22. The second determination point P22 is located away from the second endpoint Ap'(2) in a direction opposite to the predetermined circumferential direction (i.e., in the counterclockwise direction in the present preferred embodiment) by the predetermined distance D10 or less. The second determination point P22 may be singular or plural in number. The second determination processor 133 then sets a second perpendicular line L22. The second perpendicular line L22 is a straight line passing through the second determination point P22 and perpendicular to the lasso cutting line L'(2). The second determination processor 133 sets an intersection point of the second perpendicular line L22 and the lasso cutting line L'(2) to be a second intersection point P32. The second determination processor 133 subsequently calculates a second determination actual distance D22 that is a distance between the second determination point P22 and the second intersection point P32. The second determination processor 133 determines whether the second determination actual distance D22 is equal to or less than the predetermined determination distance DD10. Upon determining that the second determination actual distance D22 is equal to or less than the predetermined determination distance DD10, the second determination processor 133 determines that the second angle R22 between the outline 58 and the lasso cutting line L'(2) is equal to or smaller than the determination angle DR10.

When either one or both of the first angle R21 and the second angle R22 is/are determined to be equal to or smaller than the determination angle DR10, the lasso cutting line L'(2) is determined to be close to the outline 58. Then, the procedure goes to step S112 in FIG. 8. In the example illustrated in FIG. 13, both of the first angle R21 and the second angle R22 are equal to or smaller than the determination angle DR10, so that the procedure goes to step S112 in FIG. 8. When both of the first angle R21 and the second angle R22 are greater than the determination angle DR10, the procedure skips step S112. In other words, the lasso cutting line L'(2) set by the cutting line setting processor 125 undergoes no processing in this case. Then, the procedure goes to step S113.

When either one or both of the first angle R21 and the second angle R22 is/are determined to be equal to or smaller than the determination angle DR10, the shape change processor 134 changes the shape of the lasso cutting line L'(2) in step S112 in FIG. 8. Suppose that the first angle R21 is determined to be equal to or smaller than the determination angle DR10 by the first determination processor 131 and/or the second angle R22 is determined to be equal to or smaller than the determination angle DR10 by the second determination processor 133. In such a case, the shape change processor 134 changes the shape of the lasso cutting line L'(2) such that the first angle R21 and the second angle R22 are both greater than the determination angle DR10. The shape change processor 134 may change the shape of the lasso cutting line L'(2) in any other specific manner.

Figure 14:
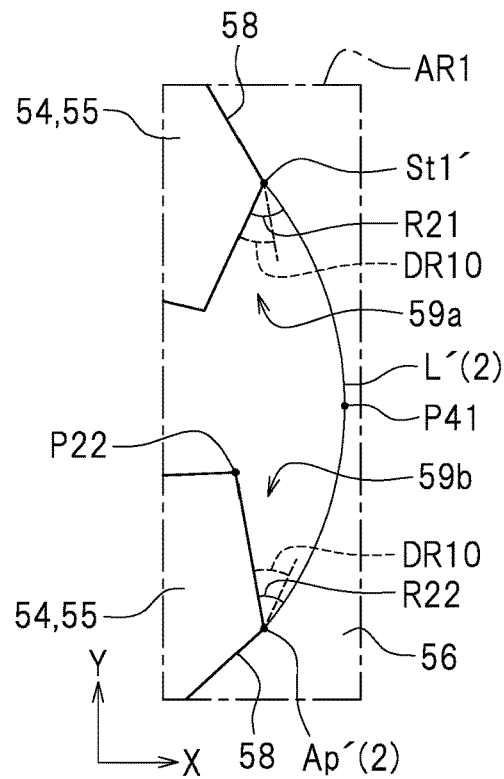
FIG. 14 is an enlarged view of the region AR1 in FIG. 12, illustrating a process for changing the shape of the lasso cutting line.

In the present preferred embodiment, the shape change processor 134 bends the lasso cutting line L'(2) in a direction opposite to the outline 58 (i.e., rightward in FIG. 13) such that the first angle R21 and the second angle R22 are each greater than the determination angle DR10. The resulting lasso cutting line L'(2) is a Bezier curve in the present preferred embodiment. As illustrated in FIG. 13, an anchor point P41 is set for the lasso cutting line L'(2). As illustrated in FIG. 14, the shape change processor 134 manipulates a handle for the anchor point P41 such that the lasso cutting line L'(2) bends in a direction opposite to the outline 58. In other words, the shape change processor 134 manipulates the handle for the anchor point P41 such that the first angle R21 and the second angle R22 are each greater than the determination angle DR10. Thus, the shape of the lasso cutting line L'(2) is changed such that the lasso cutting line L'(2) assumes a suitable shape.

After the shape of the lasso cutting line L'(2) is changed in step S112 in FIG. 8 or after the first angle R21 and the second angle R22 are both determined to be greater than the determination angle DR10 in step S111, the end determination processor 129 determines end of the procedure in step S113 in FIG. 8. In the present preferred embodiment, the end determination processor 129 ends the procedure when a candidate point adjacent to the candidate point Ap(1) in a predetermined circumferential direction relative to the candidate point Ap(1) is the end determination point Dp in the example illustrated in FIG. 11. In FIG. 11, the candidate point Ap(1) is an endpoint of the selected candidate line L(1) set to be a lasso cutting line. When the candidate point adjacent to the candidate point Ap(1) in the predetermined circumferential direction is not the end determination point Dp, the procedure goes to step S114. In the example illustrated in FIG. 11, the candidate point adjacent to the candidate point Ap(1) in the predetermined circumferential direction relative to the candidate point Ap(1) is the candidate point Ap(2). Because the candidate point Ap(2) is not the end determination point Dp, the procedure goes to step S114 in the example illustrated in FIG. 11.

Figure 15:
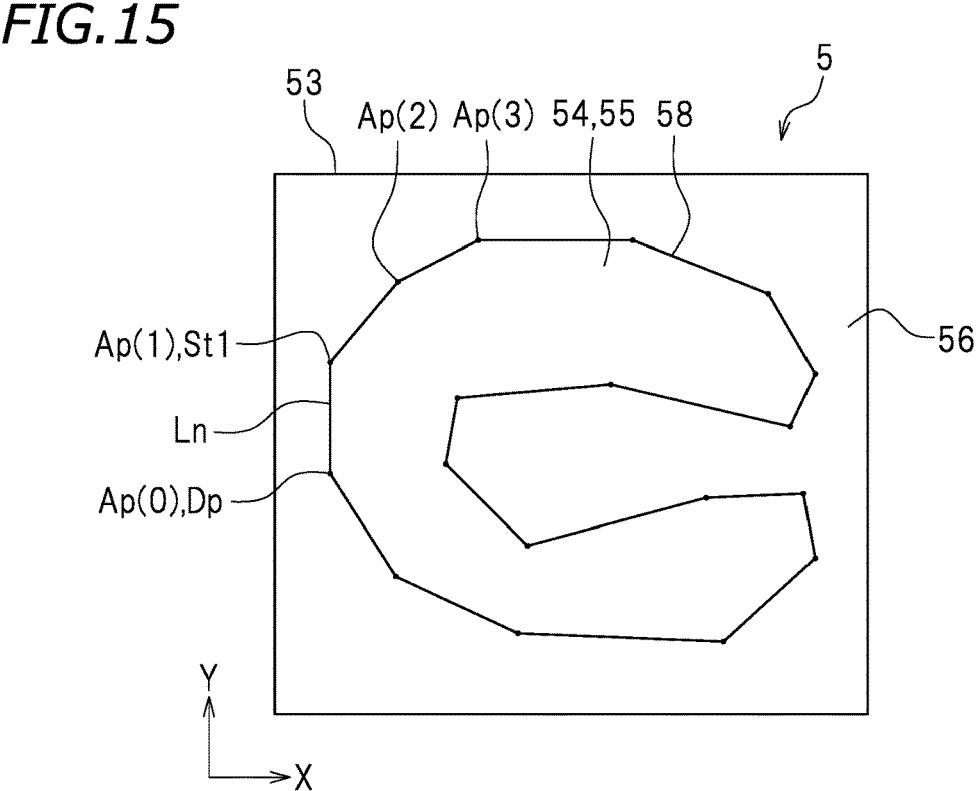
FIG. 15 is a schematic diagram of the top sheet, illustrating the lasso cutting line location deciding procedure.

In step S114 in FIG. 8, the change processor 130 changes the reference line Ln, the search point St1, and the candidate points. In the example illustrated in FIG. 11, a line connecting the search point St1 with the candidate point Ap(1) of the selected candidate line L(1) set to be the lasso cutting line in step S108 is changed to a new reference line Ln (see FIG. 15) by the change processor 130. In this example, the change processor 130 changes the selected candidate line L(1) to the new reference line Ln. The candidate point Ap(1) of the selected candidate line L(1), set to be the lasso cutting line as illustrated in FIG. 11, is set to be a new search point St1 (see FIG. 15) by the change processor 130. The change processor 130 changes the candidate points to new candidate points. As illustrated in FIG. 15, the new candidate points are candidate points Ap(2), Ap(3) . . . located between the new search point St1 and the end determination point Dp in a predetermined circumferential direction (i.e., in the clockwise direction in the present preferred embodiment) relative to the new search point St1. After the end of step S114, the procedure returns to step S105 in FIG. 8. Repeatedly performing steps S105 to S114 enables placement of other lasso cutting lines.

The lasso cutting line location deciding procedure has been described thus far. Deciding a lasso cutting line location by performing the above procedure places the lasso cutting line 60*a* at the location illustrated in FIG. 7, for example.

After a location of a lasso cutting line on the top sheet 53 is decided by the positioning apparatus 100 in the above-described manner, the cutting apparatus 10 may make a cut along the lasso cutting line and the outline 58 of the target object 54.

When the first angle R21 between the lasso cutting line L'(2) set by the cutting line setting processor 125 and the outline of the target object 54 is equal to or smaller than the predetermined determination angle DR10 as illustrated in FIG. 13, the present preferred embodiment includes changing the shape of the lasso cutting line L'(2) such that the first angle R21 is greater than the predetermined determination angle DR10. Thus, a region 59*a* (see FIG. 14) surrounded by the outline 58 of the target object 54 and the lasso cutting line L'(2) will not be a tapered region where the first angle R21 is equal to or smaller than the predetermined determination angle DR10. Accordingly, when the cutting apparatus 10 makes a cut along the outline 58 and the lasso cutting line L'(2) in FIG. 14, a region surrounded by the outline 58 of the target object 54 and the lasso cutting line L'(2) in FIG. 14 is unlikely to be broken. This prevents breakage of the sheet 5 when the cutting apparatus 10 makes a cut along the outline 58 and the lasso cutting line L'(2) in FIG. 14.

When at least either one of the first angle R21 and the second angle R22 between the lasso cutting line L'(2) and the outline 58 is equal to or smaller than the predetermined determination angle DR10 as illustrated in FIG. 13, the present preferred embodiment includes changing the shape of the lasso cutting line L'(2) by the shape change processor 134 such that the first angle R21 and the second angle R22 are each greater than the predetermined determination angle DR10. When the candidate line L'(2) is the lasso cutting line, two regions (i.e., the region 59*a* where the first angle R21 is located and a region 59*b* where the second angle R22 is located) may be tapered as illustrated in FIG. 13. Thus, the present preferred embodiment includes changing the shape of the lasso cutting line L'(2) such that the first angle R21 and the second angle R22 are each greater than the predetermined determination angle DR10. This prevents tapering of the two regions (i.e., the regions 59*a* and 59*b*) that may occur if the shape of the lasso cutting line L'(2) is not changed. Consequently, the present preferred embodiment prevents breakage of the sheet 5 when the cutting apparatus 10 makes a cut along the outline 58 and the lasso cutting line L'(2).

In the present preferred embodiment, the first determination processor 131 sets the first determination point P21 on the outline 58 as illustrated in FIG. 13. The first determination point P21 is located away from the first endpoint St1' by the predetermined distance D10 or less. The first determination processor 131 sets the first perpendicular line L21 that is a straight line perpendicular to the lasso cutting line L'(2) and passing through the first determination point P21. The first determination processor 131 then sets an intersection point of the first perpendicular line L21 and the lasso cutting line L'(2) to be the first intersection point P31. The first determination processor 131 subsequently determines whether the first determination actual distance D21 that is a distance between the first determination point P21 and the first intersection point P31 is equal to or less than the predetermined determination distance DD10, so as to determine whether the first angle R21 is equal to or smaller than the determination angle DR10. Thus, a simple process including calculating a distance between the first determination point P21 and the first intersection point P31 makes it possible to determine whether the first angle R21 is equal to or smaller than the predetermined determination angle DR10. When the first determination actual distance D21 is short, the region 59*a* surrounded by the outline 58 of the target object 54 and the lasso cutting line L'(2) is assumed to be a tapered region.

When the first angle R21 is determined to be equal to or smaller than the determination angle DR10 by the first determination processor 131, for example, the present preferred embodiment includes bending the lasso cutting line L'(2) in a direction opposite to the outline 58 (i.e., rightward in FIG. 13) by the shape change processor 134 such that the first angle R21 is greater than the determination angle DR10. Bending the lasso cutting line L'(2) so as to change at least a portion of the lasso cutting line L'(2) into a curve in this manner changes the shape of the lasso cutting line L'(2) such that the first angle R21 is greater than the determination angle DR10.

In the present preferred embodiment, the shape change processor 134 sets the anchor point P41 on the lasso cutting line L'(2). As illustrated in FIG. 14, the shape change processor 134 manipulates the handle for the anchor point P41 so as to bend the lasso cutting line L'(2). This changes the shape of the lasso cutting line L'(2). Using the anchor point P41 on the lasso cutting line L'(2) in this manner easily changes the shape of the lasso cutting line L'(2) such that the first angle R21 is greater than the determination angle DR10.

As illustrated in FIG. 7, the present preferred embodiment places the lasso cutting line 60*a* at a location where the lasso cutting line 60*a* surrounds the effective region 55 together with a portion of the outline 58 of the target object 54. As illustrated in FIG. 9, polyline vertices obtained when the outline 58 is represented as a polyline are set to be the candidate points Ap, so that a larger number of the candidate points Ap are provided. Thus, an endpoint of a lasso cutting line is selected from a larger number of the candidate points Ap. This facilitates placement of the lasso cutting line 60*a* at an optimal location. The placement of the lasso cutting line 60a allows a portion of the top sheet 53 located within the non-effective region 56 and having a complicated shape to be removed from the base sheet 51 at a later time. Thus, the present preferred embodiment facilitates removal of a portion of the top sheet 53 within the non-effective region 56 from the base sheet 51. Consequently, the present preferred embodiment prevents breakage and tearing of a portion of the top sheet 53 within the effective region 55.

In the present preferred embodiment, the cutting line setting processor 125 selects, for example, one of the candidate lines L'(1) and L'(2) located only within the non-effective region 56 and sets the selected candidate line to be a lasso cutting line as illustrated in FIG. 12. Thus, as illustrated in FIG. 7, the lasso cutting line 60a set by the cutting line setting processor 125 is not located within the effective region 55 that is a necessary region. Consequently, the present preferred embodiment enables automatic placement of the lasso cutting line 60a such that the lasso cutting line 60a does not overlap with a portion of the top sheet 53 within the effective region 55 that is a necessary region.

Second Preferred Embodiment

Figure 16:
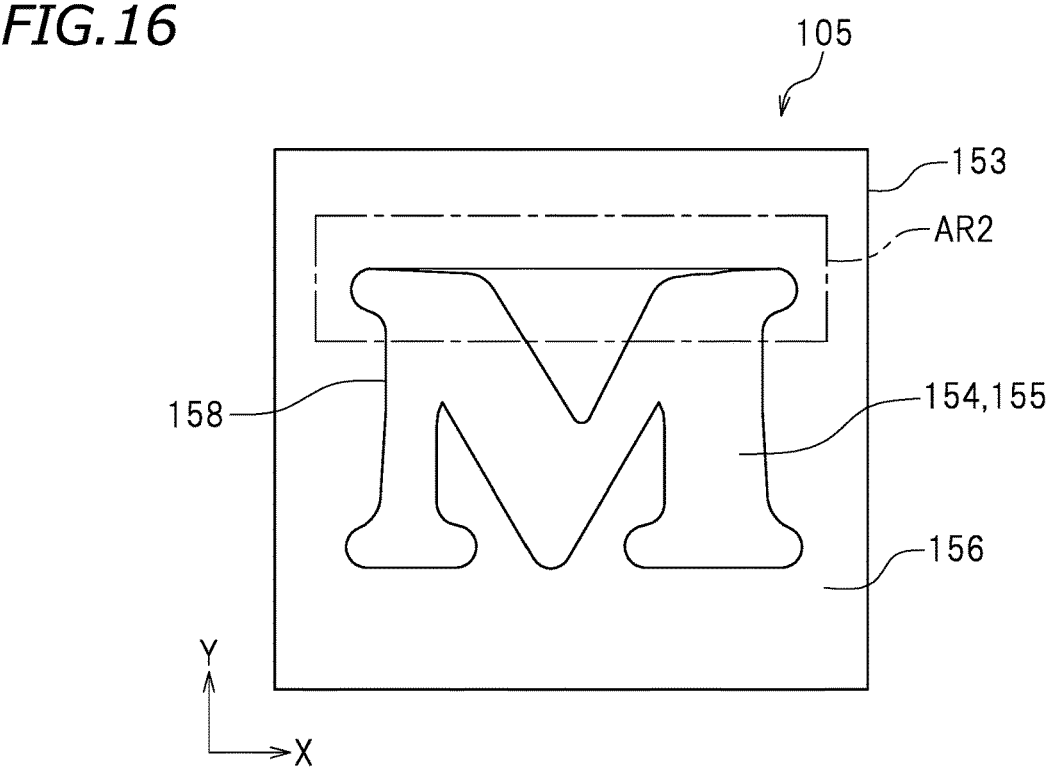
FIG. 16 is a schematic diagram illustrating a sheet according to a second preferred embodiment of the present invention.
Figure 17:
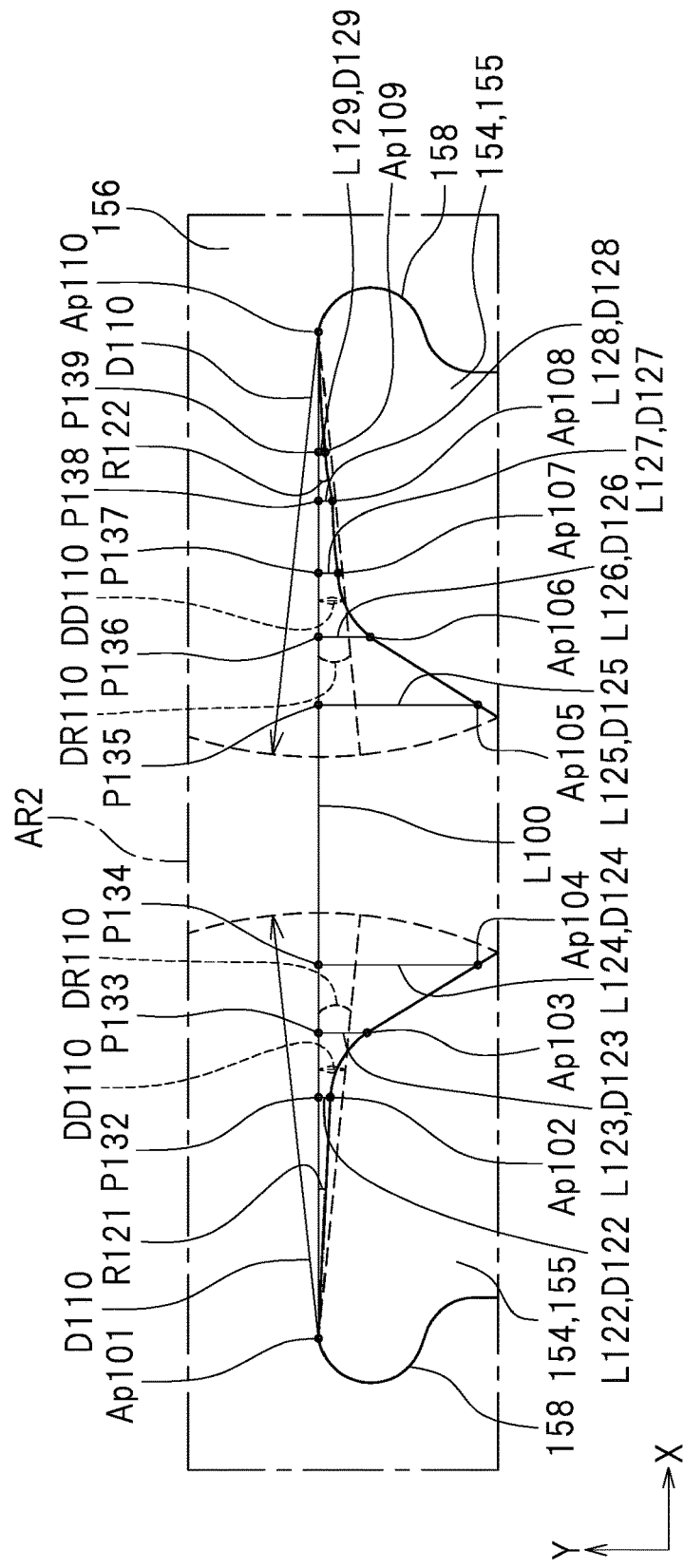
FIG. 17 is an enlarged view of a region AR2 in FIG. 16, illustrating a process for determining a lasso cutting line.
Figure 18:
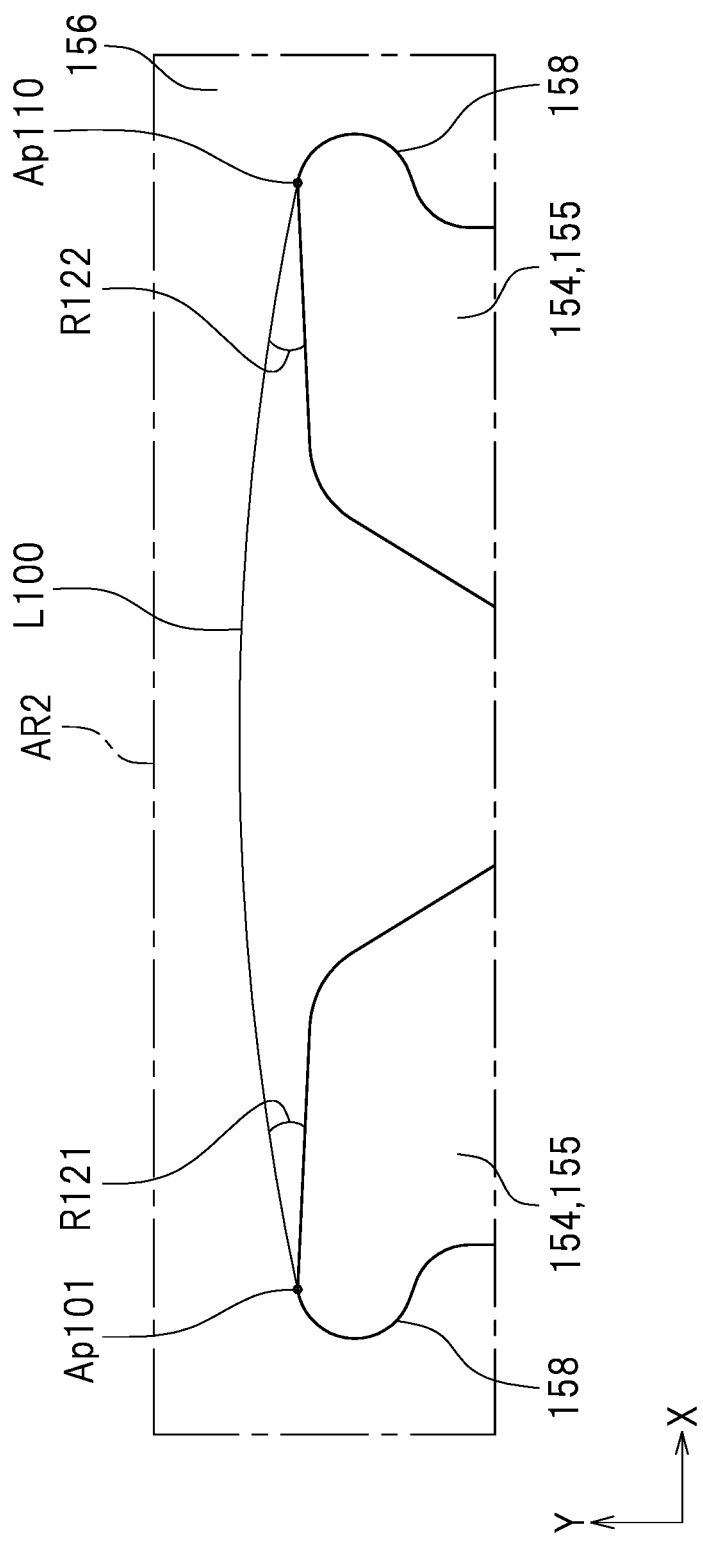
FIG. 18 is an enlarged view of the region AR2 in FIG. 16, illustrating a process for changing the shape of the lasso cutting line.

A positioning apparatus 100 according to a second preferred embodiment of the present invention will be described below. FIG. 16 is a schematic diagram illustrating a sheet 105 according to the second preferred embodiment. Each of FIGS. 17 and 18 is an enlarged view of a region AR2 in FIG. 16. Referring to FIG. 16, an M-shaped target object 154 is located on a top sheet 153 of the sheet 105. A region of the top sheet 153 indicative of the target object 154 surrounded by an outline 158 of the target object 154 is an effective region 155. A region of the top sheet 153 other than the effective region 155 is a non-effective region 156. The outline 158 is represented as a polyline. As illustrated in FIG. 17, a plurality of polyline vertices Ap101 to Ap110 obtained when the outline 158 is represented as a polyline are set on the outline 158. In FIG. 16, the polyline vertices are not illustrated. Referring to FIG. 17, the first endpoint is the polyline vertex Ap101, and the second endpoint is the polyline vertex Ap110. A line L100 connecting the first endpoint Ap101 with the second endpoint Ap110 is the lasso cutting line L100 set by the cutting line setting processor 125.

The first determination processor 131 and the second determination processor 133 make determinations on the lasso cutting line L100 as in step S111 in FIG. 8. In the present preferred embodiment, the first determination processor 131 determines whether a first angle R121 is equal to or smaller than a determination angle DR110. The first angle R121 is defined between the outline 158 and the lasso cutting line L100, with the first endpoint Ap101 located at an intersection of the outline 158 and the lasso cutting line L100. The second determination processor 133 determines whether a second angle R122 is equal to or smaller than the determination angle DR110. The second angle R122 is defined between the outline 158 and the lasso cutting line L100, with the second endpoint Ap110 located at an intersection of the outline 158 and the lasso cutting line L100.

In the present preferred embodiment, points on the outline 158 are set to be first determination points by the first determination processor 131. The first determination points are located away from the first endpoint Ap101 in a predetermined circumferential direction (i.e., in the clockwise direction in the present preferred embodiment) by a predetermined distance D110 or less. In the present preferred embodiment, polyline vertices are set to be the first determination points. In FIG. 17, the polyline vertices located away from the first endpoint Ap101 by the predetermined distance D110 or less are the polyline vertices Ap102 to Ap104. Thus, the polyline vertices Ap102 to Ap104 located away from the first endpoint Ap101 in the predetermined circumferential direction by the predetermined distance D110 or less are set to be the first determination points by the first determination processor 131. The first determination processor 131 subsequently sets first perpendicular lines L122 to L124 for the first determination points Ap102 to Ap104, respectively. The first perpendicular lines L122 to L124 are straight lines passing through the first determination points Ap102 to Ap104, respectively, and perpendicular to the lasso cutting line L100. For example, the first perpendicular line L122 is a straight line passing through the first determination point Ap102 and perpendicular to the lasso cutting line L100. Then, points of intersection of the first perpendicular lines L122 to L124 with the lasso cutting line L100 are respectively set to be first intersection points P132 to P134 by the first determination processor 131.

The first determination processor 131 subsequently calculates first determination actual distances D122 to D124. The first determination actual distance D122 is a distance between the first determination point Ap102 and the first intersection point P132. The first determination actual distance D123 is a distance between the first determination point Ap103 and the first intersection point P133. The first determination actual distance D124 is a distance between the first determination point Ap104 and the first intersection point P134. The first determination processor 131 then determines whether each of the first determination actual distances D122 to D124 is equal to or less than a predetermined determination distance DD110. Suppose that at least one of the first determination actual distances D122 to D124 is equal to or less than the predetermined determination distance DD110. In this case, the first determination processor 131 determines that the first angle R121 between the outline 158 and the lasso cutting line L100 is equal to or smaller than the determination angle DR110. In FIG. 17, the first determination actual distance D122 is equal to or less than the determination distance DD110. Thus, the first determination processor 131 determines that the first angle R121 is equal to or smaller than the determination angle DR110.

In the present preferred embodiment, the second determination processor 133 makes determinations in a manner similar to that in which the first determination processor 131 makes determinations. The second determination processor 133 first sets points on the outline 158 to be second determination points. The second determination points are located away from the second endpoint Ap110 in a direction opposite to the predetermined circumferential direction (i.e., in the counterclockwise direction in the present preferred embodiment) by the predetermined distance D110 or less. The second determination points are polyline vertices. In FIG. 17, the polyline vertices located away from the second endpoint Ap110 by the predetermined distance D110 or less are polyline vertices Ap105 to Ap109. Thus, the second determination processor 133 sets the polyline vertices Ap105 to Ap109 to be the second determination points. The second determination processor 133 subsequently sets second perpendicular lines L125 to L129 for the second determination points Ap105 to Ap109, respectively. The second perpendicular lines L125 to L129 are straight lines passing through the second determination points Ap105 to Ap109, respectively, and perpendicular to the lasso cutting line L100. In the present preferred embodiment, the second determination processor 133 sets five second perpendicular lines (i.e., the second perpendicular lines L125 to L129). Then, points of intersection of the second perpendicular lines L125 to L129 with the lasso cutting line L100 are respectively set to be second intersection points P135 to P139 by the second determination processor 133.

The second determination processor 133 subsequently calculates second determination actual distances D125 to D129. The second determination actual distance D125 is a distance between the second determination point Ap105 and the second intersection point P135. The second determination actual distance D126 is a distance between the second determination point Ap106 and the second intersection point P136. The second determination actual distance D127 is a distance between the second determination point Ap107 and the second intersection point P137. The second determination actual distance D128 is a distance between the second determination point Ap108 and the second intersection point P138. The second determination actual distance D129 is a distance between the second determination point Ap109 and the second intersection point P139. The second determination processor 133 then determines whether each of the second determination actual distances D125 to D129 is equal to or less than the predetermined determination distance DD110. Suppose that at least one of the second determination actual distances D125 to D129 is equal to or less than the predetermined determination distance DD110. In this case, the second determination processor 133 determines that the second angle R122 between the outline 158 and the lasso cutting line L100 is equal to or smaller than the determination angle DR110. In FIG. 17, the second determination actual distances D127 to D129 are each equal to or less than the determination distance DD110. Thus, the second determination processor 133 determines that the second angle R122 is equal to or smaller than the determination angle DR110.

When either one or both of the first angle R121 and the second angle R122 is/are determined to be equal to or smaller than the determination angle DR110 as described above, the shape change processor 134 changes the shape of the lasso cutting line L100. Because the shape change processor 134 changes the shape of the lasso cutting line L100 in a manner similar to that described in the first preferred embodiment, detailed description thereof will be omitted. In the present preferred embodiment, the shape change processor 134 bends the lasso cutting line L100 in a direction opposite to the outline 158 (i.e., upward in FIG. 17) such that the first angle R121 and the second angle R122 are each greater than the determination angle DR110. Thus, the shape change processor 134 changes the shape of the lasso cutting line L100. This provides the lasso cutting line L100 as illustrated in FIG. 18.

In the present preferred embodiment, the shape change processor 134 may be configured or programmed to delete the lasso cutting line L100 when all the first determination actual distances D122 to D124 are determined to be equal to or less than the predetermined determination distance DD110 by the first determination processor 131 and all the second determination actual distances D125 to D129 are determined to be equal to or less than the predetermined determination distance DD110 by the second determination processor 133.

As illustrated in FIG. 17, the first determination points according to the present preferred embodiment are the polyline vertices Ap102 to Ap104, and the second determination points according to the present preferred embodiment are the polyline vertices Ap105 to Ap109. The polyline vertices are the points set in step S102 in FIG. 8. Thus, the polyline vertices to be utilized in setting the lasso cutting line are used as the first and second determination points, resulting in a reduction in calculation time.

Figure 19:
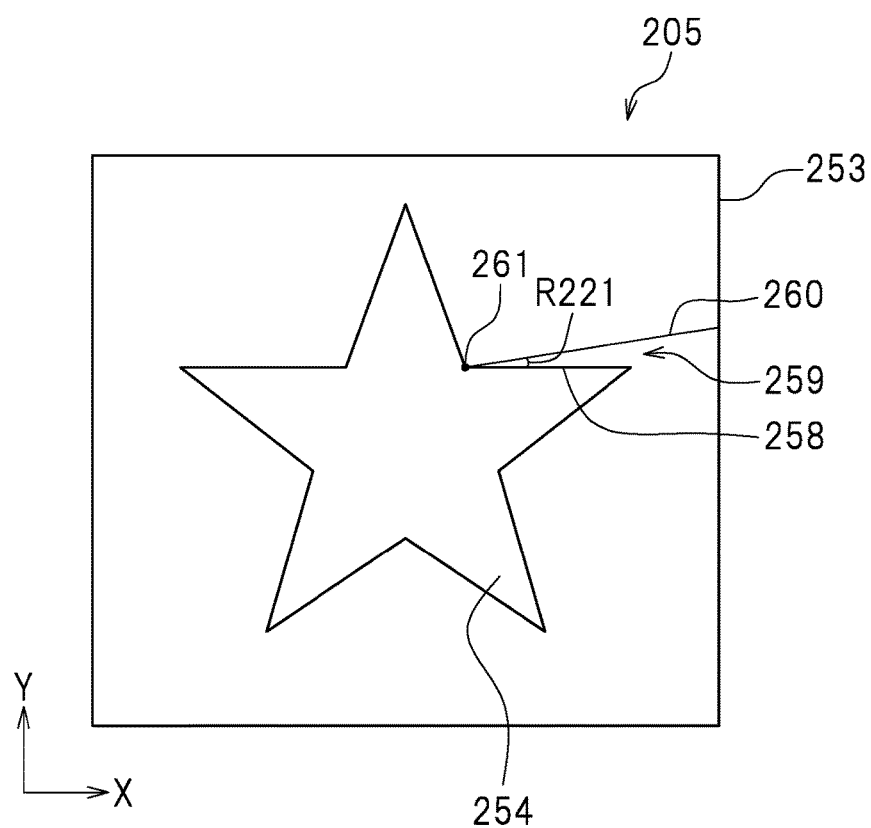
FIG. 19 is a schematic diagram illustrating a sheet known in the related art.

In the foregoing preferred embodiments, the shape change processor 134 changes the shape of a lasso cutting line, such as one described above, when necessary. Preferred embodiments of the present invention, however, may be applicable to cutting lines known in the art other than lasso cutting lines. In one example, preferred embodiments of the present invention are applicable to the cutting line 260 extending from a predetermined first endpoint 261 on the outline 258 of the target object 254 to an edge of the top sheet 253 as illustrated in FIG. 19. For example, suppose that a first angle R221 is determined to be equal to or smaller than a predetermined determination angle by the first determination processor 131. In this case, the shape change processor 134 preferably changes the shape of the cutting line 260 such that the first angle R221 is greater than the predetermined determination angle.

In the foregoing preferred embodiments, the cutting line whose shape has been changed by the shape change processor 134 preferably is a curve, for example. Alternatively, the cutting line whose shape has been changed by the shape change processor 134 may be, for example, a line including a plurality of continuous straight line segments.

In the foregoing preferred embodiments, the candidate point selected by the candidate point selection processor 116 preferably is a polyline vertex obtained when the outline of a target object is represented as a polyline, for example. Alternatively, the outline of a target object may be a Bezier curve, and an anchor point on the outline of the target object may be selected as a candidate point by the candidate point selection processor 116.

The processors of the positioning apparatus 100 (i.e., the storage processor 112, the region setting processor 114, the candidate point selection processor 116, the search point selection processor 118, the reference line setting processor 120, the candidate line setting processor 121, the candidate line selection processor 123, the angle calculation processor 124, the cutting line setting processor 125, the deletion determination processor 126, the deletion processor 127, the end determination processor 129, the change processor 130, the first determination processor 131, the second determination processor 133, and the shape change processor 134) may be implemented by software. Specifically, a computer program may be read into a computer so as to implement the processors of the positioning apparatus 100 by the computer. Preferred embodiments of the present invention include a cutting line positioning computer program to allow a computer to function as the processors. Preferred embodiments of the present invention also include a non-transitory computer-readable storage medium storing the computer program. The processors of the positioning apparatus 100 may be implemented by executing the computer program stored in the positioning apparatus 100. In this case, each of the processors of the positioning apparatus 100 may be a single processor or a plurality of processors. Preferred embodiments of the present invention also include a circuit having the functions similar to those of a program to be executed by each of the processors of the positioning apparatus 100. Preferred embodiments of the present invention also include a cutting line positioning method to be performed by the processors of the positioning apparatus 100.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cutting line positioning apparatus to decide a location of a cutting line on a sheet, the sheet including a base sheet and a top sheet affixed with an adhesive material to a surface of the base sheet and including a target object located thereon, the cutting line serving as a reference line when a cut is made on the top sheet, the top sheet being cut along an outline of the target object on the top sheet by a cutting apparatus, wherein the top sheet includes an effective region that is a region of the top sheet to be left on the base sheet, and a non-effective region that is a region of the top sheet to be removed from the base sheet, the cutting line positioning apparatus comprising:
　　a cutting line setting processor configured or programmed to set the cutting line such that the cutting line extends in a predetermined direction from a first endpoint and the cutting line is located within the non-effective region, the first endpoint being a predetermined point on the outline of the target object;
　　a first determination processor configured or programmed to determine whether a first angle is equal to or smaller than a predetermined determination angle, the first angle being defined between the outline of the target object and the cutting line, with the first endpoint located at an intersection of the outline and the cutting line, the determination angle being an acute angle; and
　　a shape change processor configured or programmed to, when the first angle is determined to be equal to or smaller than the determination angle by the first determination processor, change a shape of the cutting line such that the first angle is greater than the determination angle.

2. The cutting line positioning apparatus according to claim 1, wherein the first determination processor is configured or programmed to:
　　set a first determination point on the outline, the first determination point being located away from the first endpoint by a predetermined distance or less;
　　set a straight line to be a first perpendicular line, the straight line being perpendicular to the cutting line and passing through the first determination point; and
　　assuming that an intersection point of the first perpendicular line and the cutting line is a first intersection point, determine whether a first determination actual distance between the first determination point and the first intersection point is equal to or less than a predetermined determination distance so as to determine whether the first angle is equal to or smaller than the determination angle.

3. The cutting line positioning apparatus according to claim 2, wherein the first determination point is a vertex on the outline that is obtained when the outline is represented as a polyline.

4. The cutting line positioning apparatus according to claim 1, wherein when the first angle is determined to be equal to or smaller than the determination angle by the first determination processor, the shape change processor bends the cutting line in a direction opposite to the outline so as to change the shape of the cutting line such that the first angle is greater than the determination angle.

5. The cutting line positioning apparatus according to claim 4, wherein the shape change processor is configured or programmed to set an anchor point on the cutting line and manipulate a handle of the anchor point so as to change the shape of the cutting line.

6. The cutting line positioning apparatus according to claim 1, wherein
　　the cutting line setting processor is configured or programmed to set the cutting line such that the cutting line connects the first endpoint with a second endpoint that is a predetermined point on the outline of the target object;
　　the cutting line positioning apparatus further comprises a second determination processor configured or programmed to determine whether a second angle is equal to or smaller than the determination angle, the second angle being defined between the outline of the target object and the cutting line, with the second endpoint located at an intersection of the outline and the cutting line; and
　　when the first angle is determined to be equal to or smaller than the determination angle by the first determination processor and/or the second angle is determined to be equal to or smaller than the determination angle by the second determination processor, the shape change processor changes the shape of the cutting line such that the first angle and the second angle are each greater than the determination angle.

7. The cutting line positioning apparatus according to claim 6, further comprising:
　　a storage processor configured or programmed to store a reference point defined in advance on the top sheet;
　　a candidate point selection processor configured or programmed to select a plurality of vertices on the outline obtained when the outline is represented as a polyline, the vertices each being selected as a candidate point that serves as an endpoint of the cutting line;
　　a search point selection processor configured or programmed to select, from the candidate points, a reference search point to be used to search for a point that serves as an endpoint of the cutting line;
　　a reference line setting processor configured or programmed to set a reference line connecting the reference point with the search point;
　　a candidate line setting processor configured or programmed to set candidate lines including a plurality of lines each connecting the search point with an associated one of the candidate points other than the search point;
　　a candidate line selection processor configured or programmed to select, as a selected candidate line, the candidate line located only within the non-effective region, and select, as the selected candidate line, the candidate line on the outline when none of the candidate lines is located only within the non-effective region; and
　　an angle calculation processor configured or programmed to calculate an angle between the reference line and the selected candidate line; wherein
　　assuming that the search point is the first endpoint and the candidate point of the selected candidate line having an angle with the reference line that is a smallest angle calculated by the angle calculation processor is the second endpoint, the cutting line setting processor sets a line connecting the first endpoint with the second endpoint to be the cutting line.

8. A cutting system comprising:
　　a cutting apparatus; and the cutting line positioning apparatus according to claim 1.

9. A non-transitory computer-readable storage medium storing a cutting line positioning computer program, the computer program being operable to allow a computer to execute a cutting line positioning method for deciding a location for a cutting line on a sheet, the sheet including a base sheet and a top sheet affixed with an adhesive material to a surface of the base sheet and having a target object located thereon, the cutting line serving as a reference line when a cut is made on the top sheet, the top sheet being cut along an outline of the target object on the top sheet by a cutting apparatus, wherein the top sheet includes an effective region that is a region of the top sheet to be left on the base sheet, and a non-effective region that is a region of the top sheet to be removed from the base sheet, the method comprising:
- a cutting line setting step including setting the cutting line such that the cutting line extends in a predetermined direction from a first endpoint and the cutting line is located within the non-effective region, the first endpoint being a predetermined point on the outline of the target object;
- a first determination step including determining whether a first angle is equal to or smaller than a predetermined determination angle, the first angle being defined between the outline of the target object and the cutting line, with the first endpoint located at an intersection of the outline and the cutting line, the determination angle being an acute angle; and
- a shape change step including, when the first angle is determined to be equal to or smaller than the determination angle in the first determination step, changing a shape of the cutting line such that the first angle is greater than the determination angle.

10. A cutting line positioning method for deciding a location for a cutting line on a sheet, the sheet including a base sheet and a top sheet affixed with an adhesive material to a surface of the base sheet and having a target object located thereon, the cutting line serving as a reference line when a cut is made on the top sheet, the top sheet being cut along an outline of the target object on the top sheet by a cutting apparatus, wherein the top sheet includes an effective region that is a region of the top sheet to be left on the base sheet, and a non-effective region that is a region of the top sheet to be removed from the base sheet, the method comprising:
- a cutting line setting step including setting the cutting line such that the cutting line extends in a predetermined direction from a first endpoint and the cutting line is located within the non-effective region, the first endpoint being a predetermined point on the outline of the target object;
- a first determination step including determining whether a first angle is equal to or smaller than a predetermined determination angle, the first angle being defined between the outline of the target object and the cutting line, with the first endpoint located at an intersection of the outline and the cutting line, the determination angle being an acute angle; and
- a shape change step including, when the first angle is determined to be equal to or smaller than the determination angle in the first determination step, changing a shape of the cutting line such that the first angle is greater than the determination angle.

11. The cutting line positioning method according to claim 10, wherein
the first determination step includes setting a first determination point on the outline, the first determination point being located away from the first endpoint by a predetermined distance or less, includes setting a straight line to be a first perpendicular line, the straight line being perpendicular to the cutting line and passing through the first determination point, and includes, assuming that an intersection point of the first perpendicular line and the cutting line is a first intersection point, determining whether a first determination actual distance between the first determination point and the first intersection point is equal to or less than a predetermined determination distance so as to determine whether the first angle is equal to or smaller than the determination angle.

12. The cutting line positioning method according to claim 11, wherein the first determination point is a vertex on the outline that is obtained when the outline is represented as a polyline.

13. The cutting line positioning method according to claim 10, wherein when the first angle is determined to be equal to or smaller than the determination angle in the first determination step, the shape change step includes bending the cutting line in a direction opposite to the outline so as to change the shape of the cutting line such that the first angle is greater than the determination angle.

14. The cutting line positioning method according to claim 13, wherein the shape change step includes setting an anchor point on the cutting line and manipulating a handle of the anchor point so as to change the shape of the cutting line.

15. The cutting line positioning method according to claim 10, wherein
- the cutting line setting step includes setting the cutting line such that the cutting line connects the first endpoint with a second endpoint that is a predetermined point on the outline of the target object;
- the method further comprises a second determination step including determining whether a second angle is equal to or smaller than the determination angle, the second angle being defined between the outline of the target object and the cutting line, with the second endpoint located at an intersection of the outline and the cutting line; and
- when the first angle is determined to be equal to or smaller than the determination angle in the first determination step and/or the second angle is determined to be equal to or smaller than the determination angle in the second determination step, the shape change step includes changing the shape of the cutting line such that the first angle and the second angle are each greater than the determination angle.

16. The cutting line positioning method according to claim 15, further comprising:
- a candidate point selection step including selecting a plurality of vertices on the outline obtained when the outline is represented as a polyline, the vertices each being selected as a candidate point that serves as an endpoint of the cutting line;
- a search point selection step including selecting, from the candidate points, a reference search point to be used to search for a point that serves as an endpoint of the cutting line;
- a reference line setting step including setting a reference line that connects the search point with a reference point defined in advance on the top sheet;

a candidate line setting step including setting candidate lines including a plurality of lines each connecting the search point with an associated one of the candidate points other than the search point;

a candidate line selection step including selecting, as a selected candidate line, the candidate line located only within the non-effective region, and including selecting, as the selected candidate line, the candidate line on the outline when none of the candidate lines is located only within the non-effective region; and an angle calculation step including calculating an angle between the reference line and the selected candidate line; wherein assuming that the search point is the first endpoint and the candidate point of the selected candidate line defining an angle with the reference line that is a smallest angle calculated in the angle calculation step is the second endpoint, the cutting line setting step includes setting a line connecting the first endpoint with the second endpoint to be the cutting line.

* * * * *